(12) United States Patent
Pekar et al.

(10) Patent No.: US 8,078,291 B2
(45) Date of Patent: Dec. 13, 2011

(54) METHODS AND SYSTEMS FOR THE DESIGN AND IMPLEMENTATION OF OPTIMAL MULTIVARIABLE MODEL PREDICTIVE CONTROLLERS FOR FAST-SAMPLING CONSTRAINED DYNAMIC SYSTEMS

(75) Inventors: Jaroslav Pekar, Pacov (CZ); Francesco Borralli, Berkeley, CA (US); Gregory Stewart, North Vancouver (CA)

(73) Assignee: Honeywell International Inc., Morristown, NJ (US)

( * ) Notice: Subject to any disclaimer, the term of this patent is extended or adjusted under 35 U.S.C. 154(b) by 733 days.

(21) Appl. No.: 12/062,912

(22) Filed: Apr. 4, 2008

(65) Prior Publication Data

US 2009/0254202 A1    Oct. 8, 2009

(51) Int. Cl.
  *G05B 13/02*  (2006.01)
  *G06F 19/00*  (2006.01)
  *G06F 7/60*   (2006.01)
(52) U.S. Cl. .................. 700/28; 703/2; 700/53; 700/95
(58) Field of Classification Search .............. 700/29, 700/53, 28, 30, 95; 703/2
  See application file for complete search history.

(56) References Cited

U.S. PATENT DOCUMENTS

| | | | |
|---|---|---|---|
| 5,704,011 A | 12/1997 | Hansen et al. | 395/22 |
| 6,327,361 B1 | 12/2001 | Harshavardhana et al. | 379/230 |
| 6,760,631 B1 | 7/2004 | Berkowitz et al. | 700/28 |
| 7,151,976 B2 | 12/2006 | Lin | 700/108 |
| 7,155,334 B1 | 12/2006 | Stewart et al. | 701/114 |
| 7,165,399 B2 | 1/2007 | Stewart et al. | 60/600 |
| 7,275,374 B2 | 10/2007 | Stewart et al. | 60/601 |
| 7,328,074 B2* | 2/2008 | Das et al. | 700/28 |
| 7,328,577 B2 | 2/2008 | Stewart et al. | 60/605.2 |
| 7,337,022 B2* | 2/2008 | Wojsznis et al. | 700/36 |
| 7,587,253 B2* | 9/2009 | Rawlings et al. | 700/53 |
| 2001/0021900 A1 | 9/2001 | Kassmann | |

(Continued)

FOREIGN PATENT DOCUMENTS

EP    1 498 791 A1    1/2005

OTHER PUBLICATIONS

Baric et al., On-Line Tuning of Controllers for Systems with Constraints, IEEE, 2005.*

(Continued)

*Primary Examiner* — Albert Decady
*Assistant Examiner* — Darrin Dunn
(74) *Attorney, Agent, or Firm* — Seager, Tufte & Wickhem LLC

(57) ABSTRACT

Methods and systems for the design and implementation of optimal multivariable MPC controllers for fast-sampling constrained dynamic systems utilizing a primal-dual feasibility approach and/or a graph approach. The primal-dual feasibility approach can compute and store matrices defining constraints of quadratic programming problems in an off-line part in order to calculate vectors of Lagrange multipliers and an optimizer. Then primal-dual feasibility can be checked in an on-line part using the Lagrange multipliers and the optimizer can provide a unique optimal solution for the constrained dynamic system. The graph approach can compute and store the matrices and the vectors, and also prepare and store a structure of directed graph in off-line part. An optimizer for a given parameter vector can be determined in on-line part using the directed graph, the matrices and the vectors.

20 Claims, 17 Drawing Sheets

U.S. PATENT DOCUMENTS

| | | | |
|---|---|---|---|
| 2005/0143952 A1 | 6/2005 | Tomoyasu et al. | 702/181 |
| 2006/0137346 A1 | 6/2006 | Stewart et al. | 60/605.2 |
| 2007/0275471 A1 | 11/2007 | Coward | 436/55 |
| 2008/0071397 A1 | 3/2008 | Rawlings et al. | |
| 2009/0088918 A1* | 4/2009 | Takenaka et al. | 701/29 |

OTHER PUBLICATIONS

Bacic, Constrained NMPC via state-space partitioning for input-affine non-linear systems, IEEE, 2003.*

Bemporad et al., (An algorithm for multi-parametric quadratic programming and explicit MPC solutions, ScienceDirect, 2003.*

Rao et al., Application of Interior-Point Methods to Model Predictive Control, Journal of Optimization Theory and Applications, 1998.*

Cannon, Efficient nonlinear model predictive control algorithms, Annual Reviews in Control, 2004.*

Constrained Model Predictive Control: Stability and Optimality; D.Q. Mayne, J.B. Rawlings, C.V. Rao, P.O.M. Scokaert; www.elsevier.com/locate/automatica, Automatica 36 (2000) pp. 789-814.

Wills, A. et al., "Application of MPC to an active structure using sampling rates up to 25kHz," *Proceedings of the 44th IEEE Conference on Decision and Control, and the European Control Conference* (2005) Seville, Spain, Dec. 12-15, pp. 3176-3181.

European Search Report dated Aug. 21, 2009 for European Application No. 09155881.7.

\* cited by examiner

METHODS AND SYSTEMS FOR THE DESIGN AND IMPLEMENTATION OF OPTIMAL MULTIVARIABLE MODEL PREDICTIVE CONTROLLERS FOR FAST-SAMPLING CONSTRAINED DYNAMIC SYSTEMS

TECHNICAL FIELD

Embodiments are generally related to multivariable controller applications. Embodiments are also related to the design and implementation of optimal multivariable controllers in the context of fast-sampling constrained dynamic systems. Embodiments are additionally related to explicit quadratic programming.

BACKGROUND OF THE INVENTION

A common approach utilized in advanced industrial process control is Model-based Predictive Control, also known as "MPC". MPC typically involves the use of a controller that utilizes a mathematical model of the process to predict its future behavior and to optimize it by adjusting manipulated variables. The accuracy of the internal process model is crucial to control performance.

Process control techniques are useful in a number of industrial and other applications. Such applications may be limited, for example, by processing power. For example, an embedded controller in an automobile engine exhibits less computing power than a personal computer (PC). Additionally, the sample time associated with power train issues typically runs in a very short time (e.g., milliseconds). Therefore, industrial processes might optimally be controlled in order to meet quality and production requirements. Modern complex industrial processes, however, require multiple control variables with interacting dynamics that exhibit time delays and lags, and nonlinearities. Various process control techniques can be adapted to handle such complex industrial processes. Current process control techniques utilize MPC to determine the optimum operation of a process by monitoring one or more characteristics of the process over time.

MPC is thus a standard control and optimization technique utilized in process control, such as, for example, power train control applications in diesel engines, turbocharger control, and so forth. The acronym "MPC" therefore generally refers to a class of algorithms, which utilize an internal mathematical model of the controlled system and an optimization algorithm to compute optimal future trajectories of, for example, automotive system inputs for control action. MPC is usually implemented in the context of the so-called "Receding Horizon" scheme. In typical receding horizon control schemes, the controller can calculate future trajectories of system inputs at each sampling period, but the first control action is generally applied to the system. The receding horizon scheme also introduces standard feedback for MPC controller.

A number of MPC approaches have been implemented and discussed in MPC-related literature. For example, the article entitled "Constrained model predictive control: Stability and optimality" by D. Q. Mayne, et al., Automatica 36 (2000), pp. 789-814, provides a good survey of MPC approaches and principals, and is incorporated herein by reference in its entirety. Another article, which is incorporated herein by reference, and which describes MPC principals and techniques is entitled "A survey of industrial model predictive control technology" by S. Joe Qin, et al., Control Engineering Practice 11 (2003), pp. 733-764.

Various control techniques and approaches, both MPC and/or non-MPC in nature, have also been implemented. For example, U.S. Pat. No. 7,155,334, entitled "Use of Sensors in a State Observer for a Diesel Engine", which issued to Gregory E. Stewart et al on Dec. 26, 2006, and is assigned to Honeywell International Inc., discloses various techniques for controlling a diesel engine. U.S. Pat. No. 7,155,334 is incorporated herein by reference. U.S. Pat. No. 7,165,399, which issued to Gregory E. Stewart on Jan. 23, 2007, and is assigned to Honeywell International Inc., discusses the use of an MPC controller in association with a state observer in the context of an automotive system. U.S. Pat. No. 7,165,399 is also incorporated herein by reference.

Another prior art patent, which discloses the use of MPC techniques, is U.S. Pat. No. 7,275,374, entitled "Coordinated Multivariable Control of Fuel and Air in Engines," which issued to Gregory E. Stewart et al on Oct. 2, 2007. U.S. Pat. No. 7,275,374, which is assigned to Honeywell International Inc., is also incorporated herein by reference. A further example of an MPC control system and methodology is disclosed in U.S. Pat. No. 7,328,577, entitled "Multivariable Control for an Engine," which issued to Gregory E. Stewart et al on Feb. 12, 2008 and is assigned to Honeywell International Inc. U.S. Pat. No. 7,328,577 is incorporated herein by reference in its entirety.

MPC control can be formulated as a general optimization problem. The control objectives can be expressed by a criterion function or a cost function and by defining system constraints. The control action might be achieved by solving the optimization problem numerically at each sampling period. The time required to determine the optimal solution remains restrictive for relatively fast-sampling automotive systems even though efficient solvers have been proposed for certain class of optimization tasks, such as Linear Programming (LP) and Quadratic Programming (QP).

The overall performance of MPC can be significantly affected by the quality and accuracy of the utilized model, which is internally utilized by MPC to predict the future trajectories based on actual measurements. A nonlinear model may describe the behavior of a system relatively well, but it is more difficult to formulate and to solve MPC based on nonlinear MPC models than the linear models. A linear model can describe the dynamic behavior of the system well in a certain neighborhood of an operating point. The parameters of the linear model might be identified by utilizing data obtained from an identification experiment. A discrete-time linear model can be expressed, for example, in a state space form as indicated in equation (1.1) as follows:

$$x_{k+1} = Ax_k + Bu_k$$

$$y_k = Cx_k + Du_k \quad (1.1)$$

wherein, $x \in \hat{A}^{n_x}$ represents the system state, $u \in \hat{A}^{n_u}$ is the system input, $y \in \hat{A}^{n_y}$ is the system output and $A \in \hat{A}^{n_x \times n_x}$, $B \in \hat{A}^{n_x \times n_u}$, $C \in \hat{A}^{n_y \times n_x}$, $D \in \hat{A}^{n_y \times n_u}$ are system matrices. This model can be utilized to predict future system trajectories based on information related to the current system state, i.e. $x_k$. The prediction can be provided, for example, by equations (1.2) and (1.3) below.

$$\begin{bmatrix} x_{k+1} \\ x_{k+2} \\ M \\ x_{k+N} \end{bmatrix} = \begin{bmatrix} A \\ A^2 \\ M \\ A^N \end{bmatrix} x_k + \begin{bmatrix} B & & & \\ AB & B & & \\ M & L & O & \\ A^{N-1}B & A^{N-2}B & L & B \end{bmatrix} \begin{bmatrix} u_k \\ u_{k+1} \\ M \\ u_{k+N-1} \end{bmatrix} \quad (1.2)$$

-continued $$\begin{bmatrix} y_k \\ y_{k+1} \\ M \\ y_{k+N-1} \end{bmatrix} = \begin{bmatrix} C \\ CA \\ M \\ CA^{N-1} \end{bmatrix} x_k + \begin{bmatrix} D & & & \\ CB & D & & \\ M & L & O & \\ CA^{N-2}B & L & CB & D \end{bmatrix} \begin{bmatrix} u_k \\ u_{k+1} \\ M \\ u_{k+N-1} \end{bmatrix} \quad (1.3)$$

Using simplified notation, equations (1.2) and (1.3) can be written as $$\vec{x} = P_x^x x_k + P_u^x \vec{u}_k \quad (1.4)$$
$$\vec{y} = P_x^y x_k + P_u^y \vec{u}_k$$

wherein, $$\vec{x} = \begin{bmatrix} x_{k+1} \\ x_{k+2} \\ M \\ x_{k+N} \end{bmatrix}, \vec{y} = \begin{bmatrix} y_k \\ y_{k+1} \\ M \\ y_{k+N-1} \end{bmatrix}, \vec{u} = \begin{bmatrix} u_k \\ u_{k+1} \\ M \\ u_{k+N-1} \end{bmatrix}$$

and $P_x^x$, $P_u^x$, $P_x^y$, $P_u^y$ are corresponding matrices.

In the optimization problem, the objectives for MPC control are generally expressed as a cost function. In linear MPC, the cost function may be quadratic with linear constraints, which leads to Quadratic Programming (QP) problems. Therefore, the final form of the cost function is influenced by many factors. The basic form can be written as indicated, for example, in equation (1.5) below:

$$J(\vec{u}, x_k) = x_{k+N}^T Q_N x_{k+N} + \sum_{i=k+1}^{k+N-1} x_i^T Q x_i + \sum_{i=k}^{k+N-1} u_i^T R u_i \quad (1.5)$$

wherein, $Q \in \hat{A}^{n_x \times n_x}$, $Q_N \in \hat{A}^{n_x \times n_x}$ and $R \in \hat{A}^{n_u \times n_u}$ represent weighting matrices. If the control problem is to track a given reference signal, then the cost function can usually be written as $$J(\vec{u}, x_k) = e_{k+N}^T Q_N e_{k+N} + \sum_{i=k+1}^{k+N-1} e_i^T Q e_i + \sum_{i=k}^{k+N-1} \Delta u_i^T R \Delta u_i \quad (1.6)$$

wherein, $e_k = y_k - r_k$ is the tracking error, $r_k$ is the reference signal and $\Delta u_k = u_k - u_{k-1}$.

Using equation (1.4) and by introducing linear constraints, the optimization problem of MPC control can usually be transformed to the matrix form of equation (1.7) as follows:

$$\vec{u}^* = \operatorname*{argmin}_{\vec{u}} \left\{ \frac{1}{2} \vec{u}^T H \vec{u} + x_k^T F \vec{u} + \beta \right\} \text{ s.t. } G\vec{u} \leq W + V x_k \quad (1.7)$$

wherein, H and F represent corresponding matrices and G, W and V represent matrices defining constraints. Then the control action at each sampling period can be obtained by solving the optimization problem of equation (1.7).

In the majority of prior art applications, the optimization problem might be formulated as Quadratic Programming (QP), if the model utilized by the MPC controller is linear. The QP problem as illustrated by equation (1.7) above can be solved numerically or explicitly in each sampling period for automotive systems with relatively large sampling periods.

The numerical solution, however, is not possible for applications with relatively short sampling periods. The explicit solution to QP is well known as the Multi-Parametric Quadratic Programming (MP-QP) approach and enables relatively fast-sampling periods. The explicit solution to QP can be computed in two stages, which are typically divided into an off-line part and an on-line (i.e., "online") part. The off-line part can be utilized for pre-computations in order to save on-line time in each sampling period of MPC control.

The standard MP-QP approach can transform the optimization problem of equation (1.7) by utilizing the following coordinate transformation illustrated by equation (1.8):

$$z = \vec{u} + H^{-1} F^T x_k \quad (1.8)$$

wherein, z represents the new optimization vector of appropriate size. The new optimization problem is generally given by the following equation (1.9):

$$\min_z \left\{ \frac{1}{2} z^T H z + \overline{\beta} \right\} \text{ s.t. } Gz \leq W + Sx_k, S = V + GH^{-1}F^T. \quad (1.9)$$

The associated Lagrange function can be defined as $$L(z, \lambda) = \frac{1}{2} z^T H z + \overline{\beta} + (Gz - W - Sx_k)^T \lambda \quad (1.10)$$

wherein, $\lambda \in \hat{A}^{n_c}$ represents the vector of Lagrange multipliers. Then the optimality conditions (Karush-Kuhn-Tucker conditions) for a given problem can be expressed as follows:

$$Hz + G^T \lambda = 0,$$
$$Gz - W - Sx_k \leq 0,$$
$$\lambda_{i_A}^T (G_{i_A} - W_{i_A} - S_{i_A} x_k) = 0,$$
$$\lambda_{i_A} \geq 0. \quad (1.11)$$

wherein, $i_A$ represents a set of indices of all active constraints. If I is the set of indices of all constraints and $z^*(x_k)$ is the optimal solution to (1.9), then $i_A$ can be defined by the following equation (1.12):

$$i_A(x_k) @ \{i \in I; G_i z^*(x_k) - W_i - S_i x_k = 0\} \quad (1.12)$$

Similarly, the set of inactive constraints can be defined by equation (1.13):

$$i_{NA}(x_k) @ \{i \in I; G_i z^*(x_k) - W_i - S_i x_k < 0\} \quad (1.13)$$

Using the KKT conditions of equation (1.11) for optimal solution $z^*(x_k)$ it holds, then:

$$Hz^*(x_k) + G_{i_A}^T \lambda_{i_A}^*(x_k) = 0,$$
$$G_{i_A} z^*(x_k) - W_{i_A} - S_{i_A} x_k = 0,$$
$$G_{i_{NA}} z^*(x_k) - W_{i_{NA}} - S_{i_{NA}} x_k < 0,$$
$$\lambda_{i_A}^*(x_k) \geq 0,$$
$$\lambda_{i_{NA}}^*(x_k) = 0. \quad (1.14)$$

Utilizing the first condition in equation (1.14) and assuming that matrix H f 0 is strictly positive definite, then, $$z^*(x_k) = -H^{-1} G_{i_A}^T \lambda_{i_A}^*(x_k) \quad (1.15)$$

Using equation (1.15) and second condition in (1.14) $\lambda_{i_A}^*$ can be computed by equation (1.16) below:

$$\lambda_{i_A}^*(x_k) = -(G_{i_A}^T)^{-1}(W_{i_A} + S_{i_A} x_k) \qquad (1.16)$$

and the optimal solution can be expressed as affine function of parameter vector $x_k$ $$z^*(x_k) = H^{-1} G_{i_A}^T (G_{i_A} H^{-1} G_{i_A}^T)^{-1}(W_{i_A} + S_{i_A} x_k) \qquad (1.17)$$

Finally, the solution of equation (1.17) must satisfy constraints in equation (1.9) and Lagrange multipliers of equation (1.16) must be nonnegative, as is required by the fourth condition in equation (1.14). Both conditions can be rewritten to the form of (1.18) as follows:

$$\begin{bmatrix} GH^{-1} G_{i_{Aj}}^T (G_{i_A} H^{-1} G_{i_A}^T)^{-1} S_{i_A} - S \\ (G_{i_A} H^{-1} G_{i_A}^T)^{-1} S_{i_A} \end{bmatrix} x_k \leq \begin{bmatrix} -GH^{-1} G_{i_{Aj}}^T (G_{i_A} H^{-1} G_{i_A}^T)^{-1} W_{i_A} + W - \\ (G_{i_A} H^{-1} G_{i_A}^T)^{-1} W_{i_A} \end{bmatrix} \qquad (1.18)$$

FIGS. 1-2 illustrate example prior art graphs 100 and 200 which represent the constraints for optimization vector $$\overset{r}{u}(x_k)$$

and critical regions for a parameter vector $x_k$ using a multi-parametric quadratic programming algorithm. The stored matrices from equation (1.8) to (1.18) can be utilized in the on-line part of the multi-parametric quadratic programming algorithm to determine the optimal solution $$\overset{r_*}{u}(x_k)$$

for the given parameter vector $x_k$. As depicted in FIG. 1, system constraints for the optimization vector $$\overset{r}{u}(x_k)$$

can be plotted using the stored matrices from equations (1.8) to (1.18). As illustrated in FIG. 2, the critical regions $CR_{i_A}$ associated with a given set of active constraints indexed by $i_A$ can be defined by the inequality (1.18). The optimal solution associated with $CR_{i_A}$ is given by (1.17). The optimal MPC control action $$\overset{r_*}{u}(x_k)$$

can be obtained by utilizing the transformation of equation (1.8) as follows:

$$\overset{r_*}{u}(x_k) = -H^{-1} F^T x_k + z^*(x_k) \qquad (1.19)$$

Therefore, the solution of the optimization problem (1.9) can be divided into the off-line part and on-line part.

FIG. 3 illustrates a high-level prior art flowchart depicting an off-line method 300 for the design and implementation of optimal multivariable MPC controllers utilizing an MP-QP algorithm. As indicated at block 310, the parameter space can be partitioned so that all partitions for all feasible combinations of constraints $i_A$ (1.18) and associated affine functions for $z^*(x_k)$ (or more precisely $u_k^*(x_k)$ by using transformation (1.8)) can be computed for an optimal on-line control action. As depicted at block 320, the pre-computed critical regions $CR_{i_{Aj}}$ for j=1,2,K n, wherein n is the total number of critical regions, and the affine functions for an $u_k^*(x_k)$ are stored, the stored matrices are defined as follows:

$$M_1^j = \begin{bmatrix} GH^{-1} G_{i_{Aj}}^T (G_{i_{Aj}} H^{-1} G_{i_{Aj}}^T)^{-1} S_{i_{Aj}} - S \\ (G_{i_{Aj}} H^{-1} G_{i_{Aj}}^T)^{-1} S_{i_{Aj}} \end{bmatrix} \qquad (1.20)$$

$$m_1^j = \begin{bmatrix} -GH^{-1} G_{i_{Aj}}^T (G_{i_{Aj}} H^{-1} G_{i_{Aj}}^T)^{-1} W_{i_{Aj}} + W - \\ (G_{i_{Aj}} H^{-1} G_{i_{Aj}}^T)^{-1} W_{i_{Aj}} \end{bmatrix}$$

$$M_2^j = \left( -H^{-1} F + H^{-1} G_{i_{Aj}}^T (G_{i_{Aj}} H^{-1} G_{i_{Aj}}^T)^{-1} S_{i_{Aj}} \right)_{(1 \ldots n_u)}$$

$$m_2^j = \left( H^{-1} G_{i_{Aj}}^T (G_{i_{Aj}} H^{-1} G_{i_{Aj}}^T)^{-1} W_{i_{Aj}} \right)_{(1 \ldots n_u)}$$

FIG. 4 illustrates a high-level prior art flowchart depicting an on-line method 400 for the design and implementation of optimal multivariable MPC controllers utilizing an MP-OP algorithm. As illustrated at block 410, actual value of parameter vector $x_k$ can be read in the on-line part. Next, as depicted at block 420, the active critical region $CR_{i_A}$ can be determined for the actual value of parameter vector $x_k^*$, and the optimal control law $u_k^*(x_k)$ can be computed by utilizing the associated affine function and the active critical region.

Such a standard MP-QP control approach solves the optimization problems for automotive applications, but requires a larger memory space for storing all pre-computed results. This memory consumption can restrict the usability of the MP-QP approach for relatively small control problems such as low-order systems, a small number of constraints and short constraints horizons. Unfortunately, the number of critical regions may be, in general, an exponential function of the number of constraints. Therefore, the MP-QP approach is not suitable for applications with limited memory capacity. It may be difficult, for such an approach, to implement MPC on embedded computing environments in automotive industry exhibiting fast sample times, and low memory and processor speed available for solving mathematical algorithms.

A need therefore exists for a method and system for design and implementation of optimal multivariable MPC controllers, which are well-suitable especially for fast-sampling dynamic systems in automotive applications with low memory. Such an improved method and system is described in greater detail herein.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved method and system for the design and implementation of optimal multivariable MPC controllers for fast-sampling constrained dynamic systems.

It is another aspect of the present invention to provide for an MPC controller utilizing an explicit QP solver with a primal-dual feasibility algorithm and/or a graph algorithm.

The aforementioned aspects and other objectives and advantages can now be achieved as described herein. An improved method and system for the design and implementation of optimal multivariable MPC controllers for fast-sampling constrained dynamic systems using a primal-dual feasibility approach and/or a graph approach is disclosed herein. The primal-dual feasibility approach can compute and store matrices defining constraints of QP problem in off-line part in order to calculate vectors of Lagrange multipliers and optimizer. Then primal-dual feasibility can be determined with respect to the on-line part utilizing Lagrange multipliers and the optimizer to provide a unique optimal solution for the constrained dynamic systems. The graph approach can compute and store the matrices and the vectors, and also prepare and store a structure of directed graph with respect to the off-line part. An optimizer for a given parameter vector can be determined with respect to the on-line part utilizing the directed graph, the matrices and the vectors.

Furthermore, the matrices can be computed for all feasible combinations of active constraints in the primal-dual feasibility approach. Initially, dual feasibility can be checked "online" utilizing the Lagrange multipliers. Thereafter, primal feasibility can be checked online if a current control law is dual-feasible. The unique optimal solution can be determined if the current control law is primal-dual feasible. In the graph approach, the directed graph can be utilized to determine all primal-feasible candidates for the optimizer in an efficient manner. The directed graph can be constructed to minimize the number of feasible candidates for the optimizer.

In addition, the two approaches can be implemented in a software application, such as, for example, Matlab, for testing utilizing a Matlab testing platform. The primal-dual feasibility and graph approaches are able to save storage memory required to store the pre-computed matrices and vectors. An MPC controller is well suitable for an embedded controller in an automotive engine with fast sample times, and low memory and processor speed. The "online" implementation of an MPC controller can reduce a search of the solution space and implementation of the appropriate control law. The MPC controller can be implemented as a computer program for a specialized real-time control platform such as an electronic controller unit (ECU) in automotive control applications.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
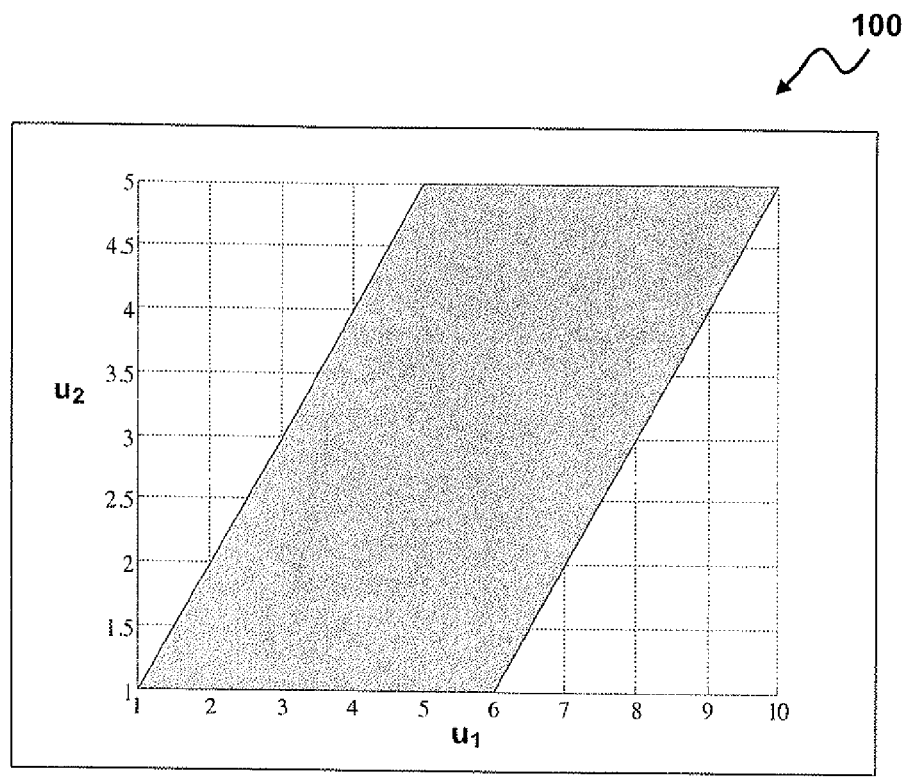
FIG. 1 illustrates an example prior art graph of constraints for the optimization vector $\tilde{u}(x_k)$ using multi-parametric quadratic programming algorithm.
Figure 2:
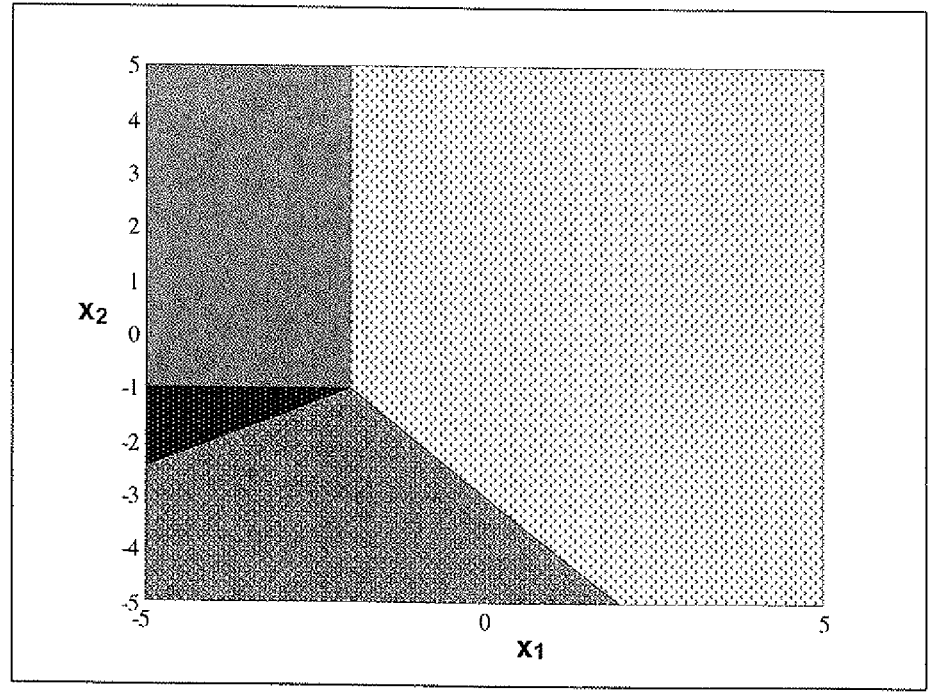
FIG. 2 illustrates an example prior art graph of critical regions for a parameter vector $x_k$ utilizing a multi-parametric quadratic programming algorithm.
Figure 3:
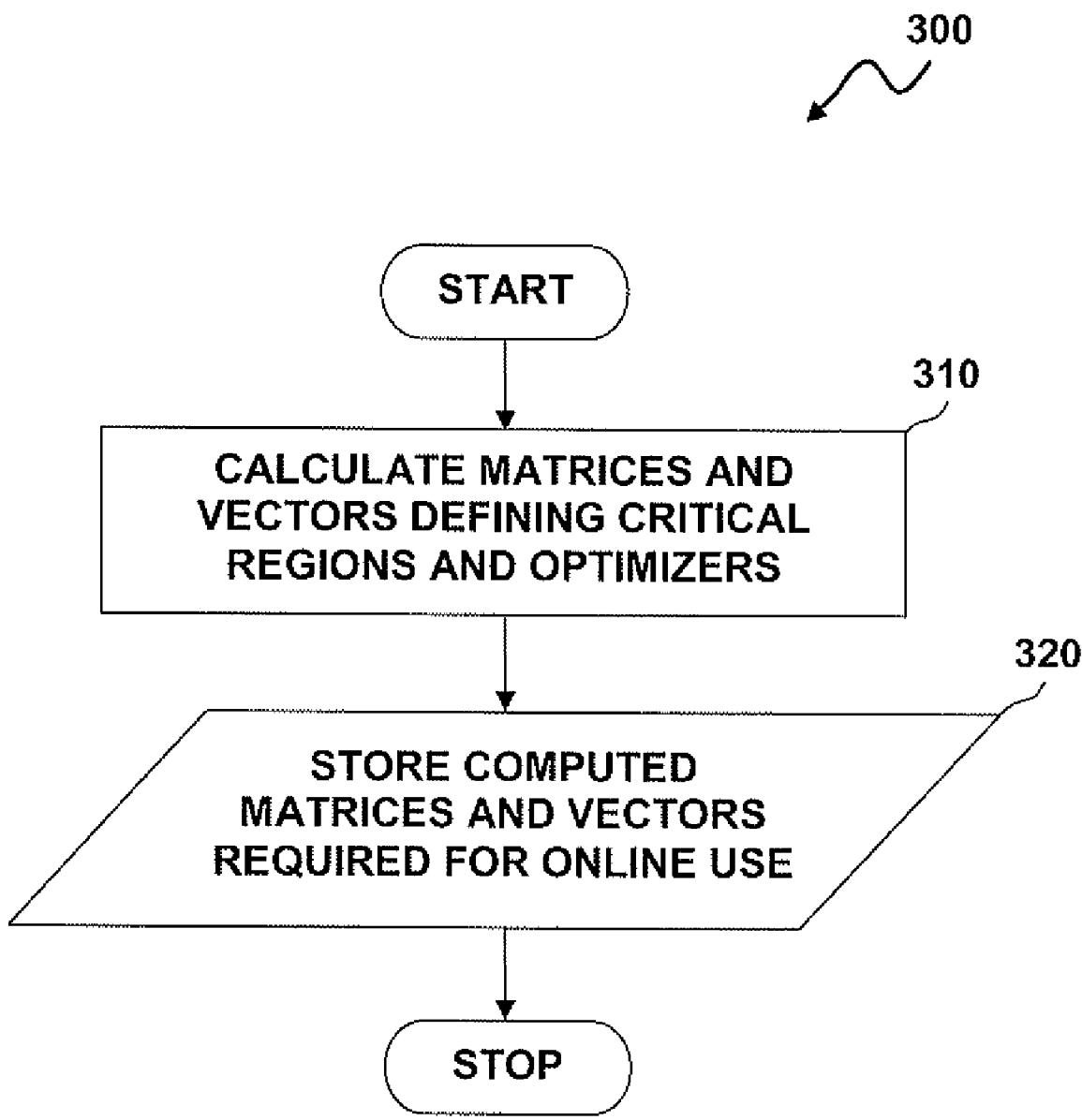
FIG. 3 illustrates a high-level prior art flowchart depicting an off-line method for the design and implementation of optimal multivariable MPC controllers using an MP-QP algorithm.
Figure 4:
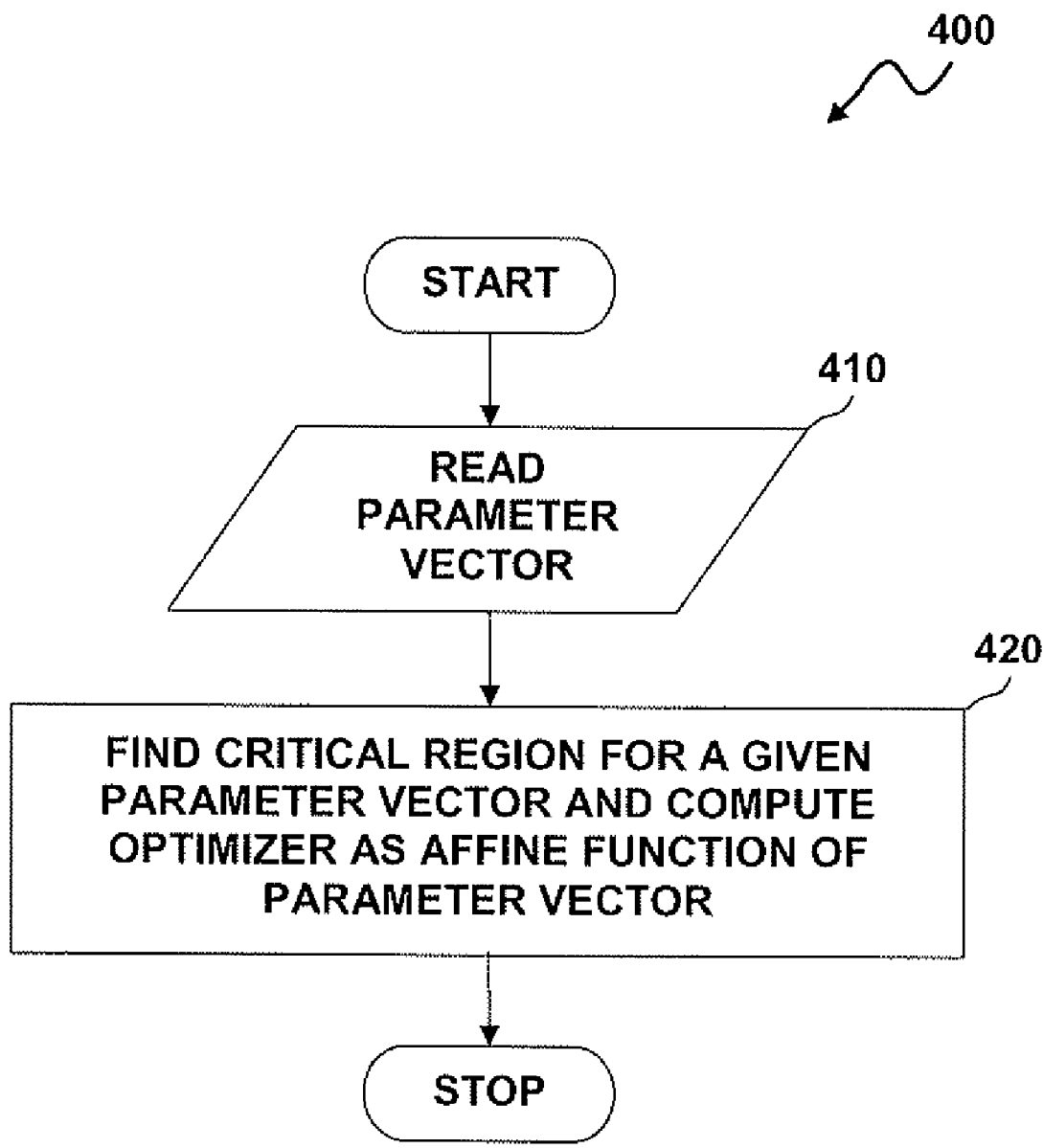
FIG. 4 illustrates a high-level flowchart illustrating an on-line method for the design and implementation of optimal multivariable MPC controllers using an MP-QP algorithm.
Figure 5:
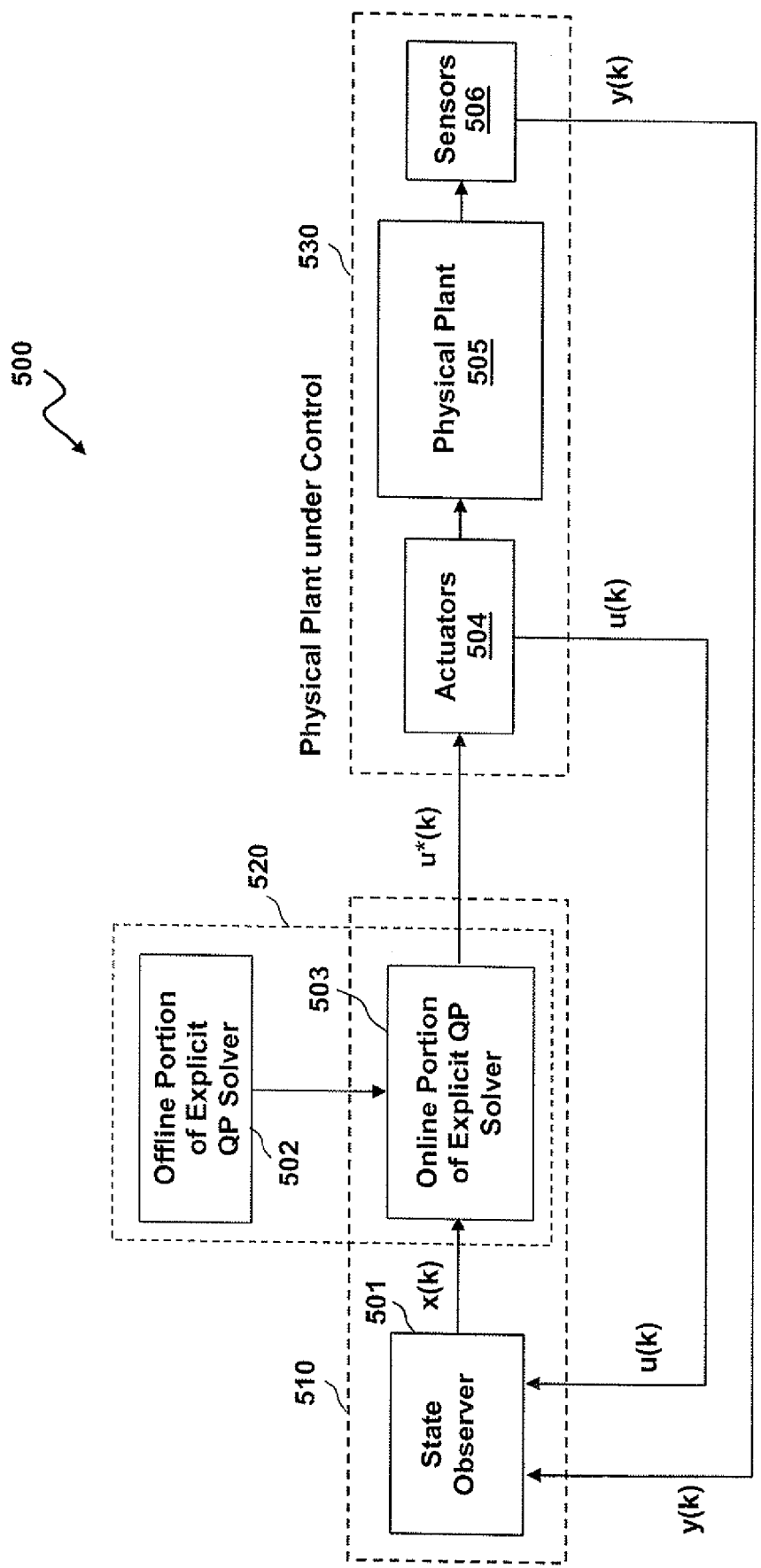
FIG. 5 illustrates a schematic block diagram depicting a general control system with an optimal MPC controller utilizing an explicit QP solver in which embodiments of the present invention may be implemented.

FIG. 5 illustrates a schematic block diagram of a general control system 500 with optimal MPC controller 510 utilizing an explicit QP solver 520 in which embodiments of the present invention may be implemented. The control system 500 can be adapted with MPG controller 510 for controlling, for example, an automotive system 530 by utilizing an explicit QP solver 520. MPC controller 510 can include a model of the dynamic operation process of the automotive system 530. MPC controller 510 can further provide predictive control signals to the automotive system 530, which may be subjected to constraints in control variables and measured output variables. The predictive control signals can be generated by determining the state of physical plant 505 utilizing actuators 504, sensors 506 and state observer 501 in MPC controller 510. The actuators 504 and the sensors 506 can be directly interconnected with a physical plant 505, such as an engine.

In addition, the explicit QP solver 520 can be implemented within MPC controller 510, and divided into an off-line portion 502 and an on-line portion 503. The explicit QP solver 520 can solve the optimization QP problems by using one of the optimization algorithms such as primal-dual feasibility algorithm and graph algorithm. Note that the off-line portion 502 can run once when user designs MPC controller 510 and the on-line portion 503 can run once per sample time of the real-time controller 510 at each discrete time k=0,1,2,K. The state observer 501 generally receives present and/or past values for a number of inputs y(k) from the sensors 506 and number of control outputs u(k) of the actuators 504. The state observer 501 can produce a current set of state variables x(k) to the on-line portion 503 of the explicit QP solver 520.

The on-line portion 503 of the QP solver 520 can compute the control outputs u*(k) based on the state variables x(k) and the stored matrices in the off-line portion 502 of the QP solver 520. Therefore, MPG controller 510 can control the effect of changes in the state of the actuators 504 on each input parameter using the computed control outputs u*(k) in order to produce a desired target value in input and output parameters of the engine 505. The control outputs u*(k) can be updated constantly, intermittently or periodically to predict the future values and the state of the engine 505 for achieving optimal multivariable control of the engine 505. MPC controller 510 with the explicit QP solver 520 can be implemented as an Electronic Controller Unit (ECU) in automotive control applications, in particular motor vehicle.

Figure 6:
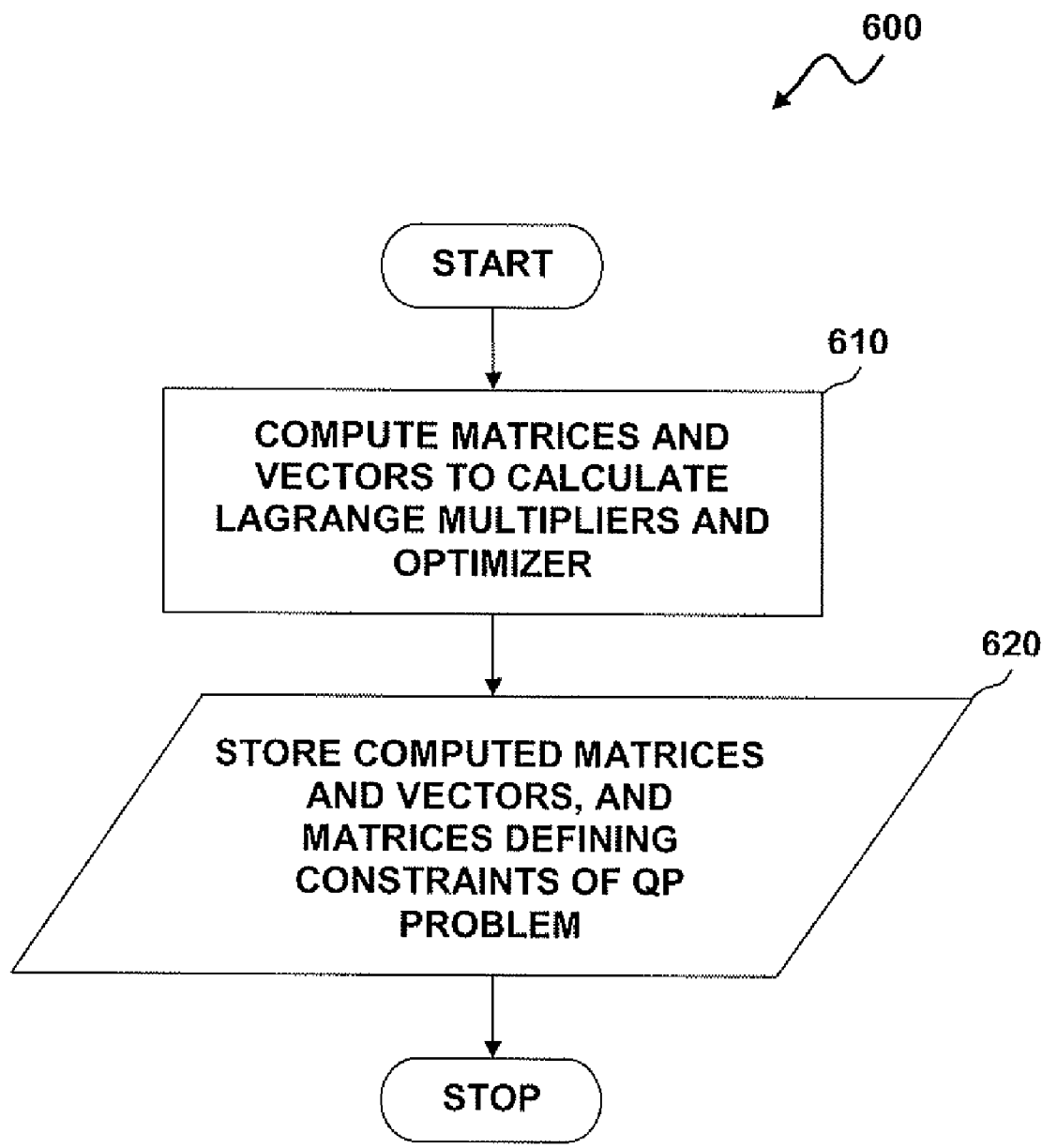
FIG. 6 illustrates a high-level flowchart illustrating an off-line method for design and implementation of optimal multivariable MPC controllers using a primal-dual feasibility algorithm in accordance with a preferred embodiment.

FIG. 6 illustrates a high-level flowchart of an off-line portion 600 for the design and implementation of optimal multivariable MPC controllers 510 using a primal-dual feasibility algorithm, in accordance with a preferred embodiment. The standard MP-QP algorithm can be modified for producing the primal-dual feasibility algorithm, which enables to save memory while keeping CPU utilization in the on-line part. Note that most of the equations are common for both approaches. The off-line portion 600 computes matrices and vectors for use in the on-line part.

As illustrated at block 610, matrices and vectors for all feasible combinations of active constraints in the automotive system 530 can be computed in order to calculate the Lagrange multipliers and the optimizer in the on-line part. As depicted at block 620, the computed matrices and vectors can be stored in the off-line portion 502 of the QP solver 520. The computed matrices can define the constraints of QP optimization problem. Multivariable MPC controllers 510 with the primal-dual feasibility approach can be implemented as a computer program on a specialized real-time control platform.

Figure 7:
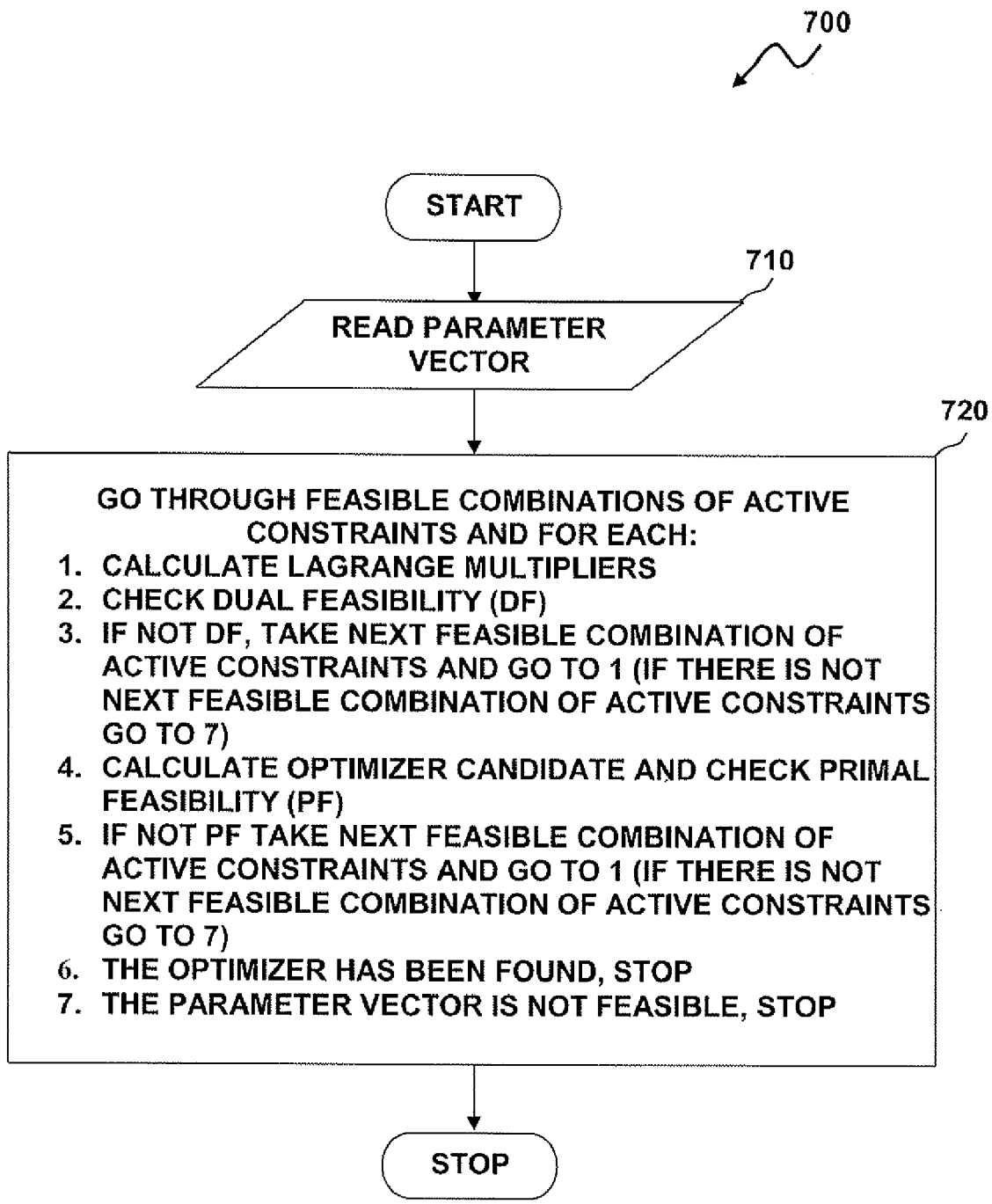
FIG. 7 illustrates a high-level flowchart illustrating an on-line method for design and implementation of optimal multivariable MPC controllers using the primal-dual feasibility algorithm in accordance with a preferred embodiment.

FIG. 7 illustrates a high-level flowchart of an on-line method 700 for design and implementation of optimal multivariable MPC controllers 510 using the primal-dual feasibility algorithm, in accordance with a preferred embodiment. In the on-line part, the optimization scheme can be applied in each sampling period of the MPC control algorithm. As described at block 710, the parameter vector estimated by the state observer 501 can be read initially. As indicated thereafter at block 720, the parameter vector can be checked through all feasible combinations of the active constraints in the automotive system 530. In this checking step, initially, the Lagrange multipliers can be calculated in order to determine the dual feasibility of the parameter vector using matrices and vectors stored in the off-line portion 502 of the QP solver 520. If the parameter vector is not dual feasible, then the next feasible combination of the active constraints can be checked for dual feasibility.

Thereafter, an optimizer candidate can be calculated in order to determine the primal feasibility (PF) in the parameter vector, if the parameter vector is found to be dual-feasible. If the parameter vector is not one that leads to a primal feasible optimizer candidate, then the next feasible combination of the active constraints can be examined in order to determine the optimizer. The QP optimization problem can be solved utilizing the optimizer. The dual-primal feasibility-checking step can then be terminated, when either the parameter vector leads to dual-primal feasibility (the solution has been found) or all feasible combinations of the active constraints were checked without success (the solution has not been found). Such an "online" implementation of MPC controller 510 utilizing the primal-dual feasibility algorithm can reduce a search of the solution space and implementation usage of the appropriate parameter vector. Note that "online" generally refers to the use of or access to a computer and/or computer network such as the well-known "Internet' and/or an "Ethernet". An example of an "online" system to which the embodiments described herein can be accessed and processed is system 2000 depicted and described in greater detail herein with respect to FIG. 20.

Figure 8:
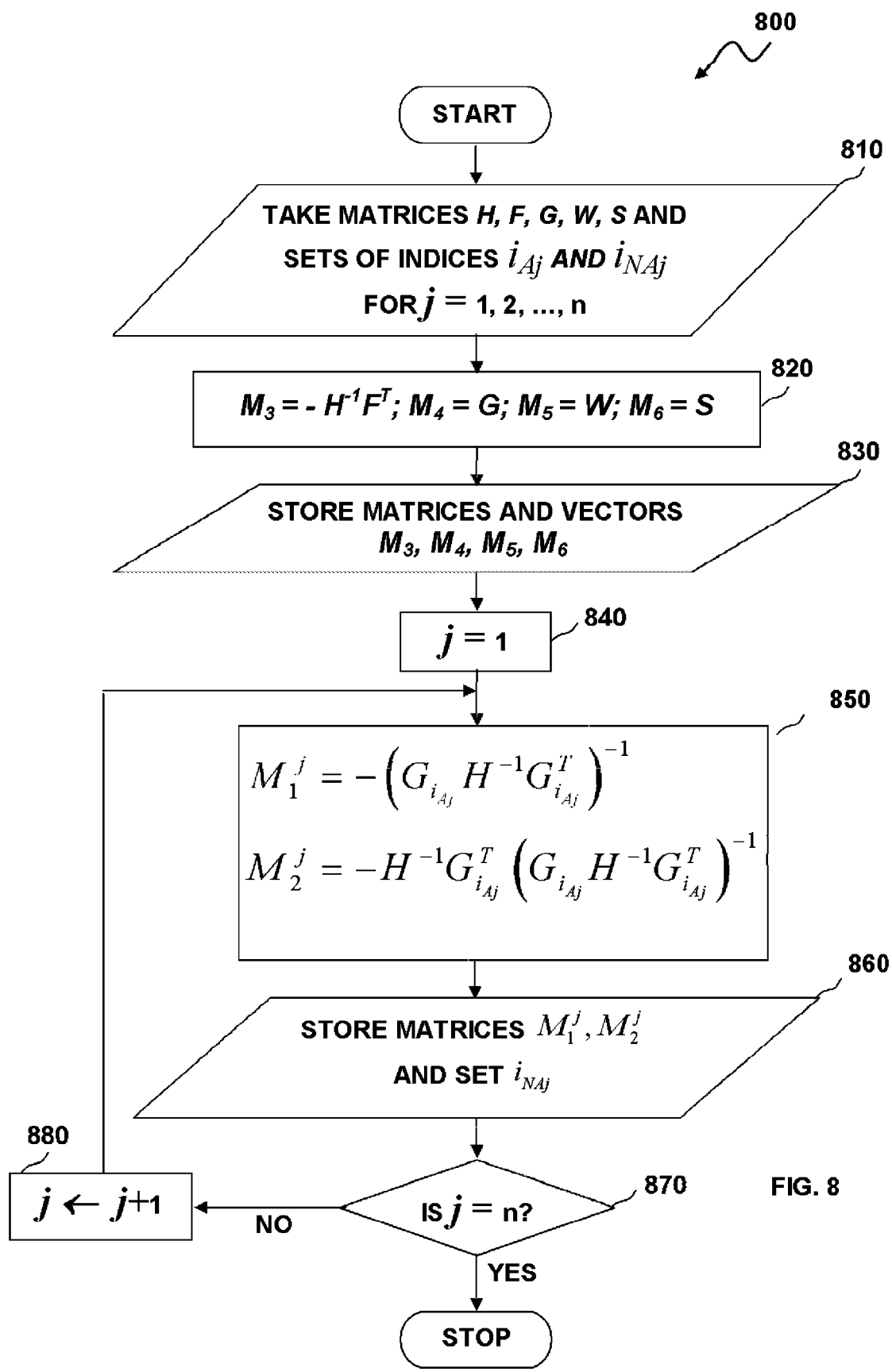
FIG. 8 illustrates a detailed flowchart illustrating an off-line method for design and implementation of optimal multivariable MPC controllers using the primal-dual feasibility algorithm in accordance with a preferred embodiment.

FIG. 8 illustrates a detailed flowchart of an off-line portion 800 for the design and implementation of optimal multivariable MPC controllers 510 using a primal-dual feasibility algorithm, in accordance with a preferred embodiment. Before compiling the primal-dual feasibility algorithm, assuming that $i_A$, is a set of indices of active constraints and $i_{NA}$ is a set of indices of inactive constraints at optimal solution in accordance with the Karush-Kuhn-Tucker (KKT), conditions for the optimal solution as follows:

$$Hz^*(x_k) + G_{i_A}^T \lambda_{i_A}^*(x_k) = 0,$$

$$G_{i_A} z^*(x_k) - W_{i_A} - S_{i_A} x_k = 0,$$

$$G_{i_{NA}} z^*(x_k) - W_{i_{NA}} - S_{i_{NA}} x_k < 0,$$

$$\lambda_{i_A}^*(x_k) \geq 0,$$

$$\lambda_{i_{NA}}^*(x_k) = 0. \qquad (1.21)$$

The vector of optimal Lagrange multipliers is given by $$\lambda_{i_A}^*(x_k) = -(G_{i_A}H^{-1}G_{i_A}^T)^{-1}(S_{i_A}x_k + W_{i_A}) \quad (1.22)$$

Then the optimal solution is given by $$z^*(x_k) = H_{-1}G_{i_A}^T(G_{i_A}H^{-1}G_{i_A}^T)^{-1}(S_{i_A}x_k + W_{i_A}) \quad (1.23)$$

As illustrated at block 810, matrices and vectors for all feasible combinations of active constraints can be computed for counter j=1,2, . . . ,n, wherein n is the total number of feasible combinations of active constraints. As depicted at block 820, the appropriate matrices can be calculated based on the corresponding constraints and matrices defining the QP problem. The computed matrices and the vectors are stored and the counter is set to j=1, as mentioned at respective blocks 830 and 840. As illustrated at block 850, the vector of Lagrange multipliers $\lambda_{i_A}^*(x_k)$ in the on-line part, (i.e. matrices $-(G_{i_A}H^{-1}G_{i_A}^T)^{-1}S_{i_A}$ and $-(G_{i_A}H^{-1}G_{i_A}^T)^{-1}W_{i_A}$), can be computed. Similarly, $z^*(x_k)$ and $u_k^*(X_k)$ can be computed using the matrices $H^{-1}G_{i_A}^T(G_{i_A}H^{-1}G_{i_A}^T)^{-1}$ and $-H^{-1}F^T$.

As depicted at block 860, the matrices $M_1^j$, $M_2^j$, $M_3^j$ and the sets of indices $i_{NAj}$ are stored. The stored matrices can be denoted as:

$$M_1^j = -(G_{i_{Aj}}H^{-1}G_{i_{Aj}}^T)^{-1}S_{i_{Aj}}, j=1, 2, \ldots n$$

$$M_2^j = -(G_{i_{Aj}}H^{-1}G_{i_{Aj}}^T)^{-1}W_{i_{Aj}}, j=1, 2, \ldots n$$

$$M_3^j = -H^{-1}G_{i_{Aj}}^T, j=1, 2, \ldots n$$

$$M_4 = (-H^{-1}F^T)_{(1 \ldots n_u)}$$

$$M_5 = G$$

$$M_6 = W$$

$$M_7 = S$$

$$M_1^j = -(G_{i_{Aj}}H^{-1}G_{i_{Aj}}^T)^{-1}, j=1, 2, \ldots n$$

$$M_2^j = H^{-1}G_{i_{Aj}}^T(G_{i_{Aj}}H^{-1}G_{i_{Aj}}^T)^{-1}, j=1, 2, \ldots n$$

$$M_3 = (-H^{-1}F^T)_{(1 \ldots n_u)}$$

$$M_4 = G$$

$$M_5 = W$$

$$M_6 = S \quad (1.24)$$

As indicated at block 870, the counter j=1 can be checked for the set of indices to terminate the process, if not so, then repeat the process from step 850 for counter j=j+1, as displayed at block 880, in order to compute and store matrices and vectors for all feasible combinations of active constraints.

Figure 9A:
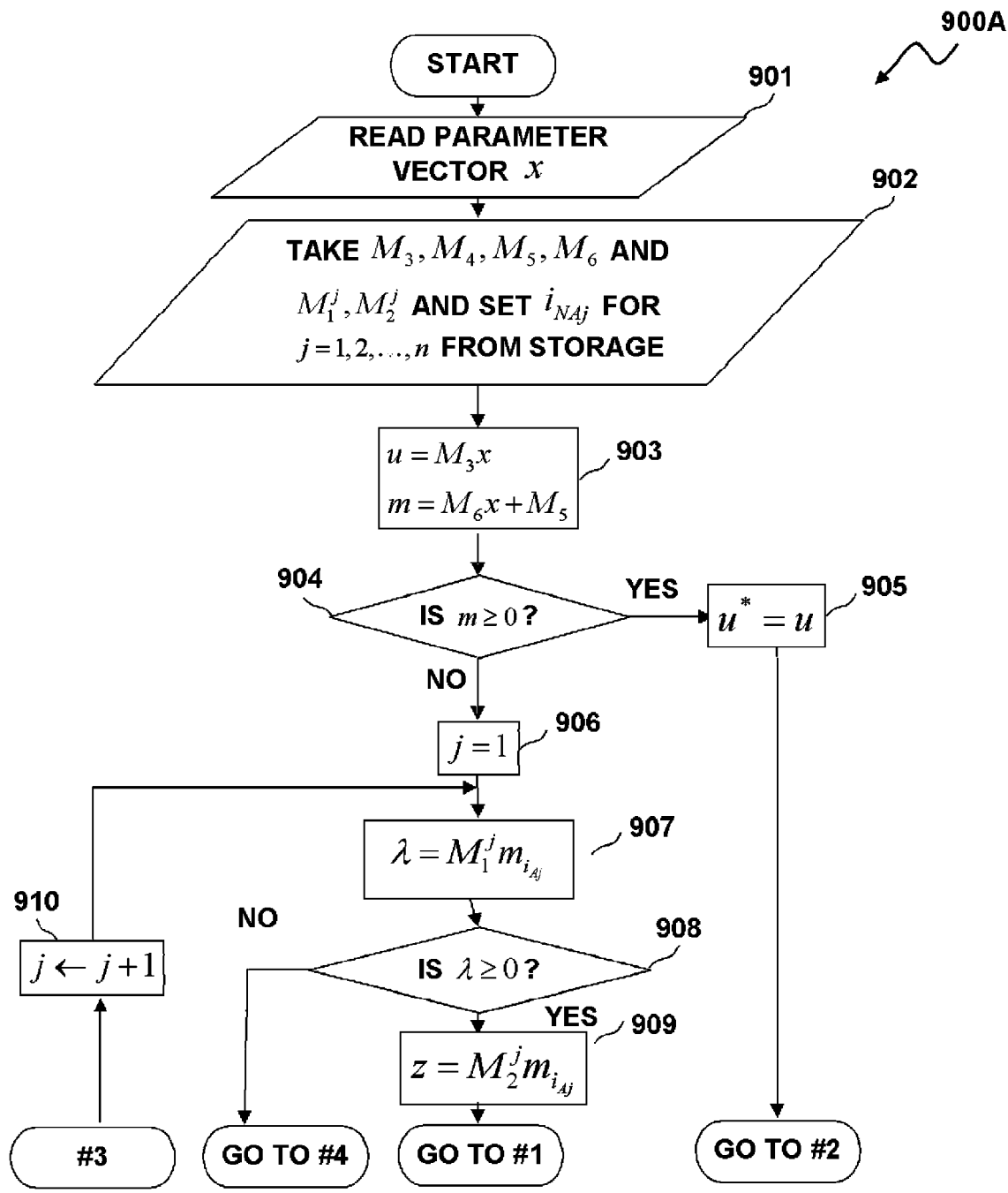
FIGS. 9A-9B illustrate a detailed flowchart illustrating an on-line method for design and implementation of optimal multivariable MPC controllers using the primal-dual feasibility algorithm in accordance with a preferred embodiment.
Figure 9B:
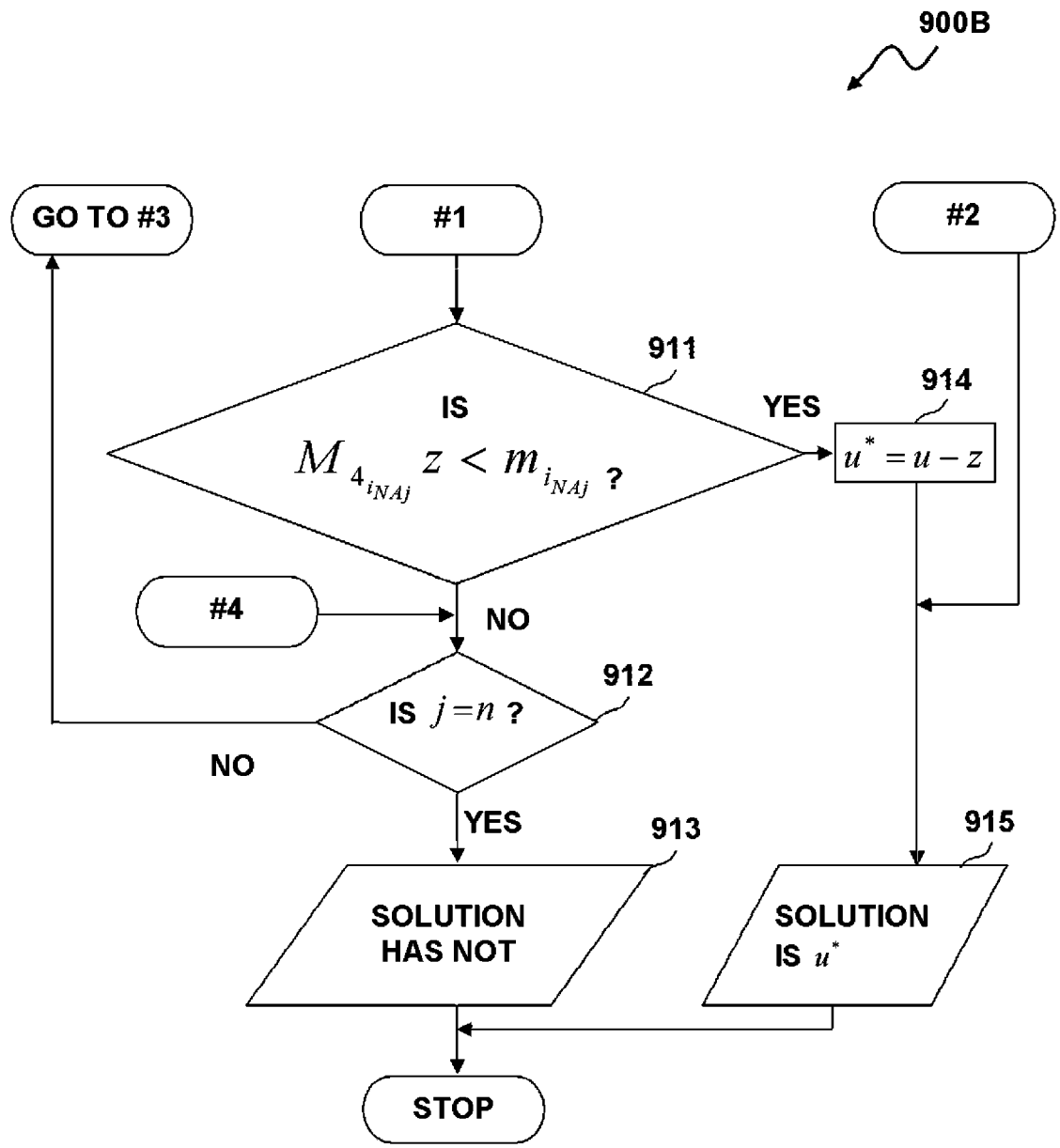

FIGS. 9A-9B illustrate a high-level flowchart of an on-line method 900A to 900B for the design and implementation of optimal multivariable MPC controllers 510 using the primal-dual feasibility algorithm, in accordance with a preferred embodiment. Note that the method(s) 900A and 9006 represents the same process. That is method 900B is a continuation of method 900A. In the on-line part, an optimization scheme can be processed for each sampling period of the MPC control algorithm. As illustrated at block 901, the parameter vector $X_k$ can be measured or estimated, for example, by the state observer 501. As depicted thereafter at block 902, the matrices $M_3$, $M_4$, $M_5$, $M_6$, $M_1^j$, $M_2^j$ and the sets of indices $i_{Naj}$ stored in the off-line portion 502 of the QP solver 520 can be retrieved. As indicated next at block 903, vector $u_k(x_k) = M_3 x_k$, and vector $m = M_6 x_k + M_5$ can be computed to find $m \geq 0$, as displayed at block 904. Then, as illustrated at block 905, the optimal control action can be given by $u_k^*(x_k) = u_k(x_k)$ to inform that the optimal solution is found. Next, the operations can continue to the process depicted at block 915.

Thereafter, as indicated at block 906, if $m \geq 0$ is not true, set counter j=1 to denote the jth set of indices of the active constraints by $i_{Aj}$ and jth set of indices of the inactive constraints by $i_{NAj}$. As indicated at block 907, vector $\lambda_{i_{Aj}}(X_k) = M_1^j m_{(i_{Aj})}$ can be computed to check the dual feasibility, (i.e. $\lambda_{i_{Aj}}(X_k) \geq 0$), as illustrated at block 908. If vector $\lambda_{i_{Aj}}(X_k)$ is dual feasible, then the operations can proceed to block 909 or else go to block 912. If j<n is not true in the block 912 and as indicated at respective blocks 912 and 913, the optimal solution is not found. As illustrated at block 909, the vector $z(x_k) = M_2^j m_{(i_{Aj})}$ can be computed to check the primal feasibility, (i.e, $M_{5(i_{Naj})} z(x_k) < m_{i_{Naj}}$), as shown in block 911. If vector $z(x_k)$ is primal feasible, then set $z^*(x_k) = z(x_k)$ and compute the optimal control action as $u_k^*(x_k) = u_k(x_k) - (z^*(x_k))_{(1 \ldots n_u)}$, as depicted at block 914. Finally, as illustrated at block 915, the vector u* is informed as the optimal solution.

For example, according to equation (1.7), the optimization problem can be defined as equation (1.25) by assuming $n_u=2$, $n_x=2$.

$$H = \begin{bmatrix} 2 & 0 \\ 0 & 1 \end{bmatrix}, \quad (1.25)$$

$$F = \begin{bmatrix} 1 & 0 \\ 0 & 1 \end{bmatrix},$$

$$\beta = 0,$$

$$G = \begin{bmatrix} -1 & 1 \\ 1 & -1 \\ 0 & 1 \\ 0 & -1 \end{bmatrix},$$

$$W = \begin{bmatrix} 0 \\ 5 \\ 5 \\ -1 \end{bmatrix},$$

$$V = \begin{bmatrix} 0 & 0 \\ 0 & 0 \\ 0 & 0 \\ 0 & 0 \end{bmatrix}$$

and the parameter vector $x_k$ is constrained by $$\begin{bmatrix} -5 \\ -5 \end{bmatrix} \leq \begin{bmatrix} 1 & 0 \\ 0 & 1 \end{bmatrix} x_k \leq \begin{bmatrix} 5 \\ 5 \end{bmatrix} \quad (1.26)$$

Then, the number of feasible combinations of active constraints is n=3 (case with all inactive constraints is not included), and the feasible combinations are {(1), (4), (1,4)}. The following matrices (see (1.24)) are stored according to the off-line part of the control algorithm, $$M_1^1 = -0.6667, M_2^1 = \begin{bmatrix} -0.3333 \\ 0.6667 \end{bmatrix} \quad (1.27)$$

$$M_1^1 = -1, M_2^1 = \begin{bmatrix} 0 \\ -1 \end{bmatrix} \quad (1.28)$$

-continued $$M_1^3 = \begin{bmatrix} -2 & -2 \\ -2 & -3 \end{bmatrix}, M_2^3 = \begin{bmatrix} -1 & -1 \\ 0 & -1 \end{bmatrix} \quad (1.29)$$

$$M_4 = \begin{bmatrix} -0.5 & 0 \\ 0 & -1 \end{bmatrix} \quad (1.30)$$

$$M_5 = \begin{bmatrix} -1 & 1 \\ 1 & -1 \\ 0 & 1 \\ 0 & -1 \end{bmatrix}, M_6 = \begin{bmatrix} 0 \\ 5 \\ 5 \\ -1 \end{bmatrix}, M_7 = \begin{bmatrix} -0.5 & 1 \\ 0.5 & -1 \\ 0 & 1 \\ 0 & -1 \end{bmatrix} \quad (1.31)$$

The stored matrices from (1.27) to (1.31) can be utilized in the on-line part of the primal-dual feasibility algorithm to find the optimal solution for the given parameter vector $x_k$.

Figure 10:
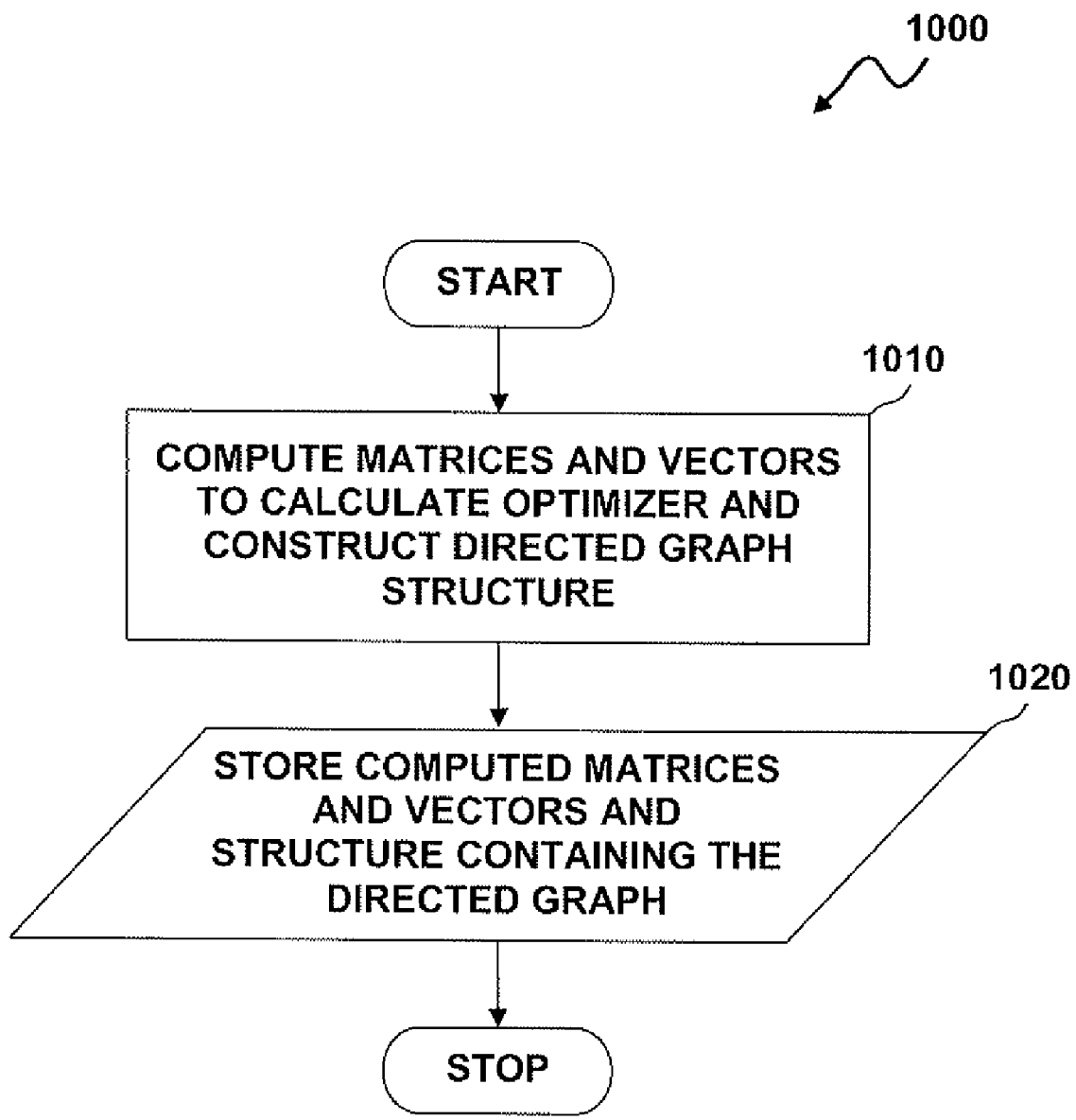
FIG. 10 illustrates a high-level flowchart illustrating an off-line method for design and implementation of optimal multivariable MPC controllers using a graph algorithm in accordance with an alternative embodiment.

FIG. 10 illustrates a high-level flowchart of an off-line portion 1000 for the design and implementation of optimal multivariable MPC controllers 510 utilizing a graph algorithm, in accordance with an alternative embodiment. The graph approach methodology is another approach to solve the optimization problem of the form (1.9). In this graph approach, a directed graph structure can be constructed and stored in the off-line part. Then the graph can be utilized in the on-line part of the algorithm to find all primal-feasible candidates for optimizer in an efficient way. The graph is constructed to minimize the number of feasible candidates for optimizer. The optimizer can be determined within the set of all feasible candidates utilizing the cost function defining the optimization problem. The optimizer is the candidate that leads to the lowest value of the cost function.

Assume that the optimization problem exhibits n feasible combinations of active constraints, (i.e. $i_{Aj}$ for counters j=1, 2,K n), with associated affine functions to calculate the optimizer for a given parameter vector x, i.e.

$$u_j^*(x_k) = M_2^j x_k + m_2^j, j=1,2,K,n \quad (1.32)$$

In the off-line method 1000, matrices defining affine functions for all feasible combinations of active constraints $i_{Aj}$ for j=1,2,K,n, wherein n is the total number of feasible combinations of active constraints, can be determined as $$M_2^j = \left(-H^{-1}F + H^{-1}G_{i_{Aj}}^T \left(G_{i_{Aj}} H^{-1} G_{i_{Aj}}^T\right)^{-1} S_{i_{Aj}}\right)_{(1\ldots n_u)} \quad (1.33)$$

$$m_2^j = \left(H^{-1} G_{i_{Aj}}^T \left(G_{i_{Aj}} H^{-1} G_{i_{Aj}}^T\right)^{-1} W_{i_{Aj}}\right)_{(1\ldots n_u)}$$

As illustrated at block 1010, the associated matrices $M_2^j$ and vectors $m_2^j$, (i.e. (1.33)), can be computed to calculate the optimizer, and also the directed graph structure can be prepared. As depicted at block 1020, the computed vectors and matrices H, F, G, W and V and the directed graph structure can be stored, wherein the matrices G, W and V generally define the constraints of the original optimization problem.

Figure 11:
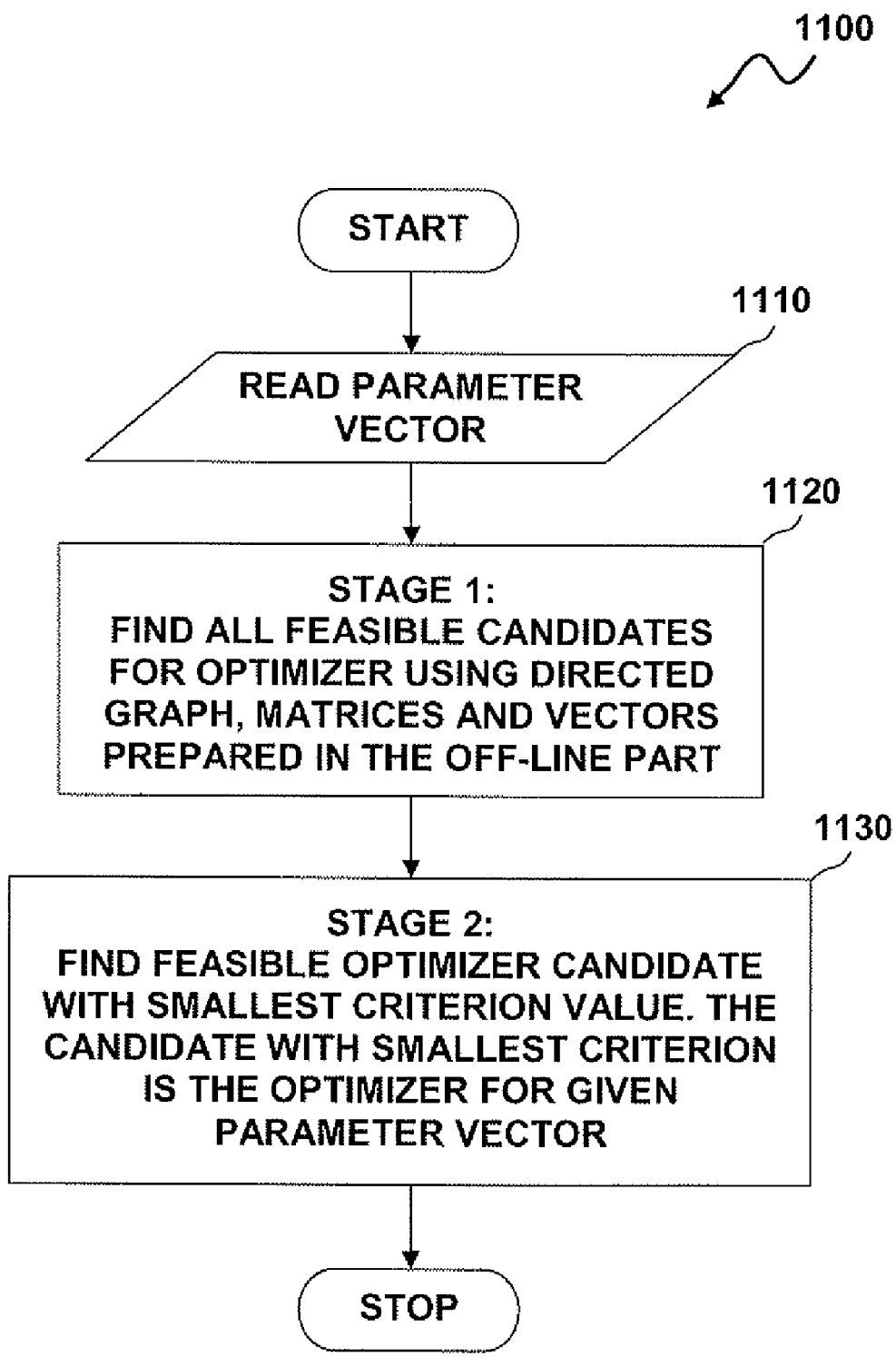
FIG. 11 illustrates a high-level flowchart illustrating an on-line method for design and implementation of optimal multivariable MPG controllers using the graph algorithm in accordance with an alternative embodiment.

FIG. 11 illustrates a high-level flowchart of an on-line method 1100 for the design and implementation of optimal multivariable MPC controllers 510 using the graph algorithm, in accordance with an alternative embodiment. In the on-line method 1100, the optimization scheme can be performed in each sampling period of MPC control algorithm. As illustrated at block 1110, the parameter vector can be provided by the state observer 501. As depicted at block 1120, all feasible candidates for optimizer can be found by performing breath-first search using the directed graph, the matrices and the vectors prepared in the off-line part.

Especially, the candidates for optimizer can be calculated for each node in the breath-first search using equation (1.32), i.e. $u_k^j(x_k)$. Then, the feasibility of the candidate can be checked by utilizing $Gu_k^j(x_k) \leq W+Vx_k$. If the candidate is feasible, the node can be marked as "feasible" and all successors of the node can be recursively marked as "not-interesting". Similarly, if the candidate is not feasible, the node is marked as "not-interesting". As specified at block 1130, a value of criterion function, (i.e. $J_j(x_k) = u_k^j(x_k)^T Hu_k^j(x_k) + x_k^T Fu_k^j(x_k)$), can be computed for all feasible candidates for optimizer in order to find the feasible optimizer candidate with smallest criterion value. The optimal control action $u_k^*(x_k)$ is equal to the candidate with smallest value of cost function $J_j(x_k)$. The optimizer candidate with the smallest criterion value can be utilized as the optimal solution for the given parameter vector $x_k$.

Figure 12:
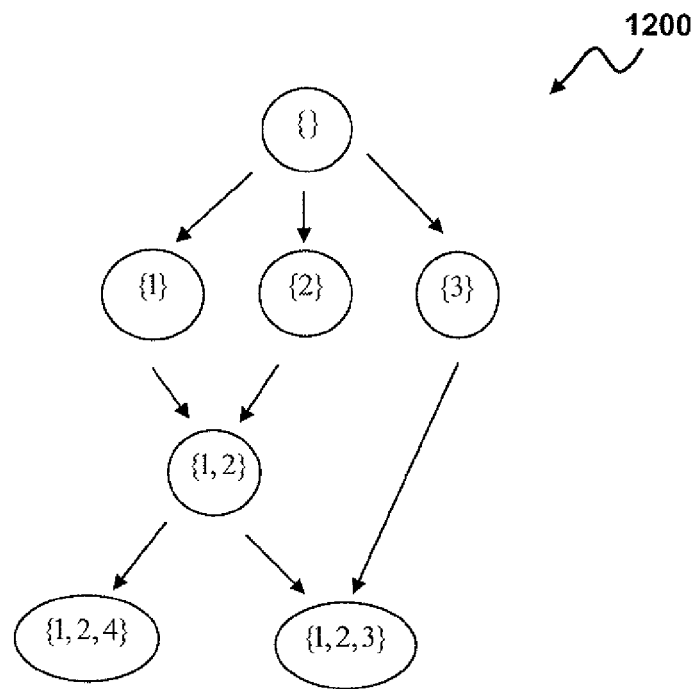
FIG. 12 illustrates an example of a directed graph in an off-line part of the graph algorithm in accordance with an alternative embodiment.

FIG. 12 illustrates an example of directed graph 1200 in an off-line part of the graph algorithm, in accordance with an alternative embodiment. For example, assume that the optimization problem contains the following feasible combinations of active constraints $$i_{A1} = \{\}$$
$$i_{A2} = \{1\}, i_{A3} = \{2\}, i_{A4} = \{3\}$$
$$i_{A5} = \{1,2\}$$
$$i_{A6} = \{1,2,4\}$$
$$i_{A7} = \{1,2,3\} \quad (1.34)$$

and the associated affine functions to calculate the optimizer for a given parameter vector x, i.e.

$$u^*(x) = M_2^j x + m_2^j, j=1,2,K,7 \quad (1.35)$$

In the off-line part, the directed graph 1200, as shown in FIG. 12, can be prepared using the above feasible combinations of the active constraints and the associated affine functions.

Figure 13:
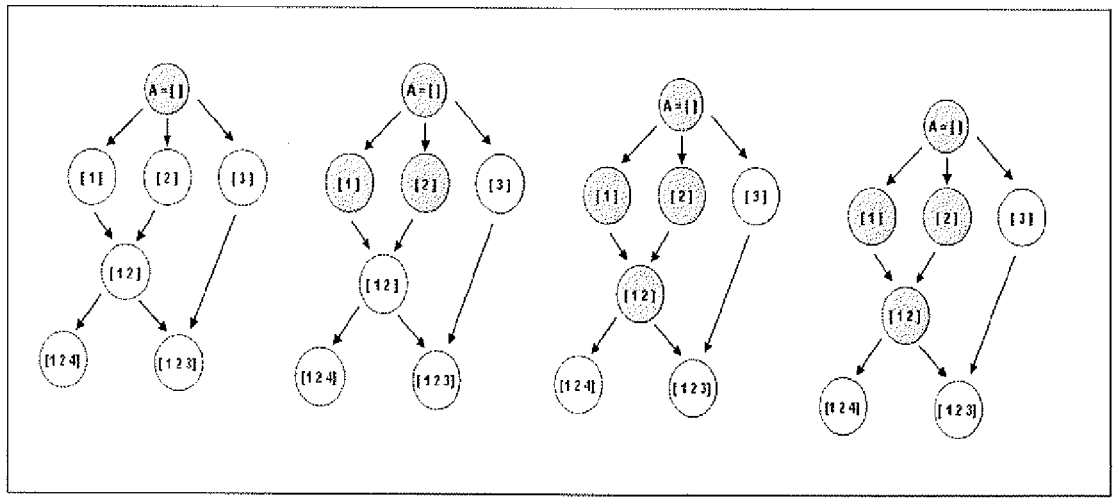
FIG. 13 illustrates an example of breath-first search procedure in an on-line part using the directed graph in accordance with an alternative embodiment.

FIG. 13 illustrates an example of a breath-first search procedure 1300 in an on-line part using the directed graph 1200, in accordance with an alternative embodiment. In the on-line part, initially, all feasible candidates for optimizer can be found for the given parameter vector $x_k$ by means of breath-first search procedure 1300. The sequential flow of all feasible candidates in the directed graph 1200 is clearly shown in FIG. 13. The directed graph 1200 represents the matrices and the constraints of the automotive system 530. Then the on-line algorithm takes all feasible candidates for optimizer and evaluates criterion cost function for each candidate. The optimizer, (i.e. optimal control law), is equal to the candidate with lowest cost function. Such graph approach can be implemented in Matlab for testing using a Matlab testing platform in order to provide a unique optimal solution for the fast-sampling constrained dynamic systems.

Figure 14:
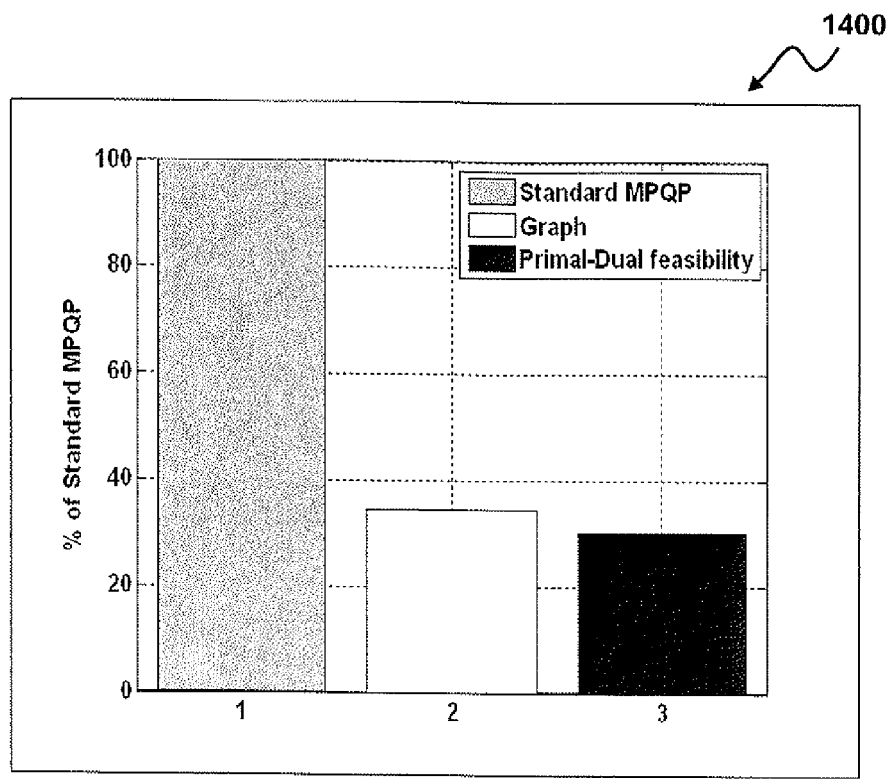
FIG. 14 illustrates a comparison bar chart of a memory consumption using standard MP-QP, graph and primal-dual feasibility approaches in accordance with an alternative embodiment.
Figure 15:
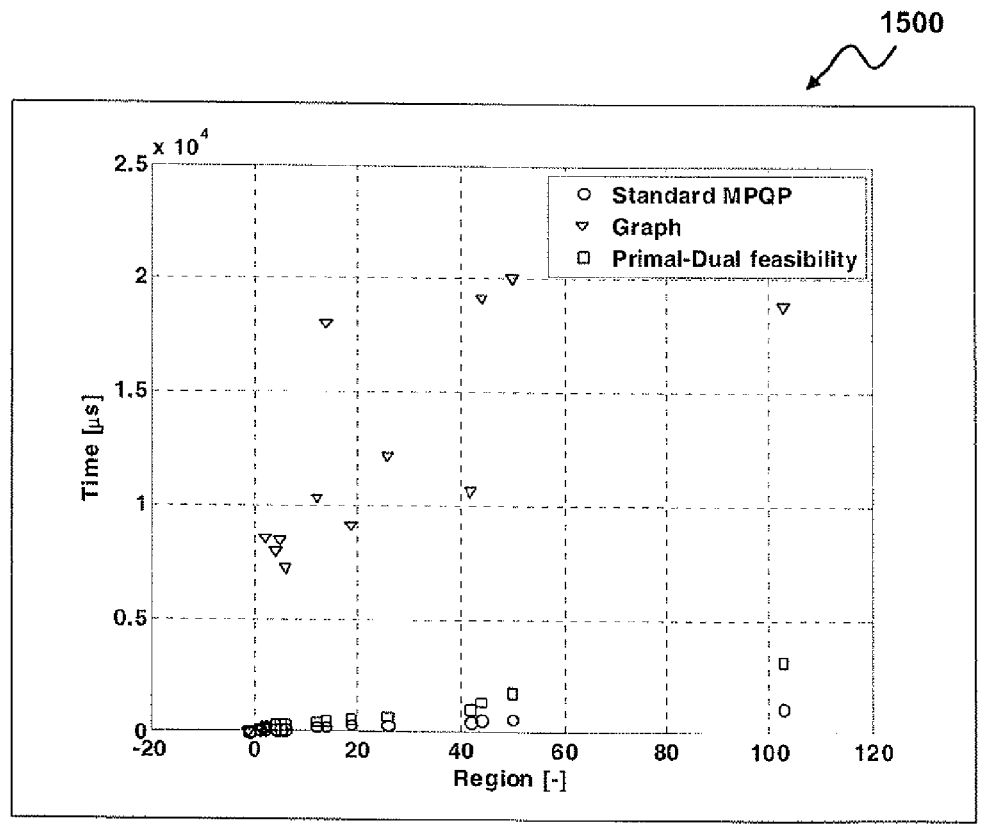
FIG. 15 illustrates a comparison graph of a CPU performance using standard MP-QP and primal-dual feasibility approaches in accordance with an alternative embodiment.

FIGS. 14-15 illustrate a comparison bar chart 1400 of memory consumption and a comparison graph 1500 of CPU performance using standard MP-QP, graph and primal-dual feasibility approaches, in accordance with an alternative embodiment. The comparison bar chart 1400 illustrates storage utilization using the three approaches, which ensures that the primal-dual feasibility approach and the graph approach can save storage memory needed to store the pre-computed matrices and vectors as compared to the standard MP-QP solution. Similarly, the comparison graph 1500 deals with the CPU (Pentium 4 CPU, 3.2 GHz) utilization in the on-line part using the three approaches, which ensures that the on-line computation time of the graph approach are slightly poor in comparison with the standard MP-QP approach or with the primal-dual feasibility approach.

Figure 16:
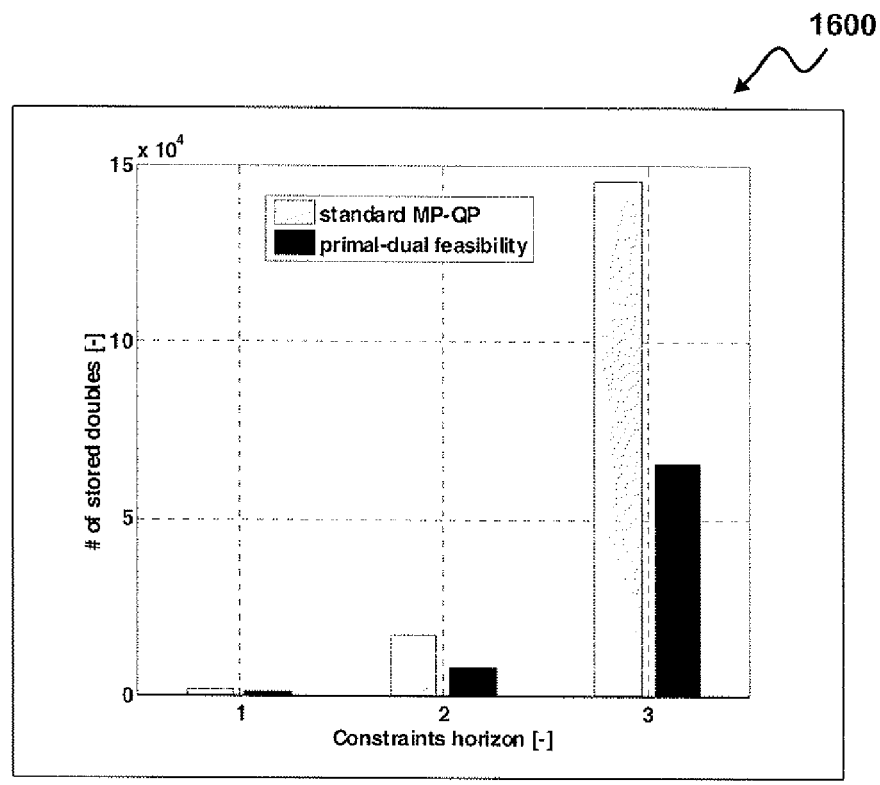
FIG. 16 illustrates a comparison bar chart of a memory utilization for different number of constraints using the standard MP-QP and primal-dual feasibility approaches in accordance with an alternative embodiment.
Figure 17:
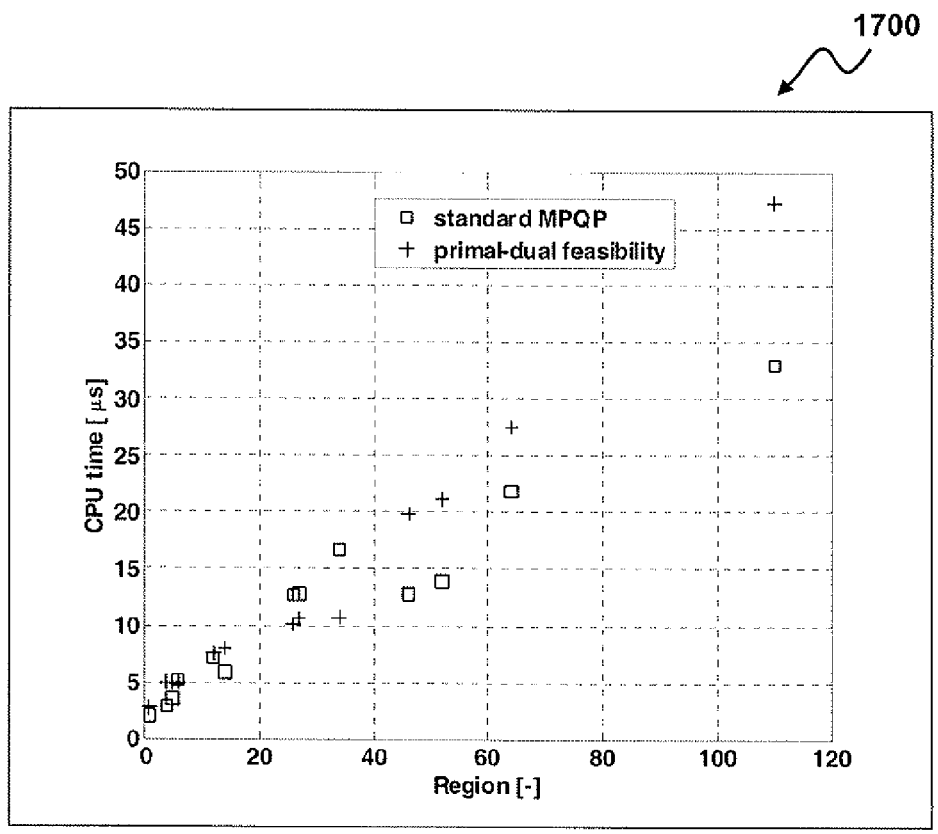
FIG. 17 illustrates a comparison graph of a CPU performance for different number of constraints using the standard MP-QP and primal-dual feasibility approaches in accordance with an alternative embodiment.

FIGS. 16-17 illustrate a comparison bar chart 1600 of memory utilization and a comparison graph 1700 of CPU performance for different number of constraints using the standard MP-QP and primal-dual feasibility approaches, in accordance with an alternative embodiment. In FIG. 16, the comparison bar chart 1600 clearly demonstrates that the memory utilization for different number of constraints is low in the primal-dual feasibility approach than the standard MP-QP approach. In FIG. 17, the comparison graph 1700 clearly indicates the CPU time over the critical regions using the standard MP-QP and primal-dual feasibility approaches.

Figure 18:
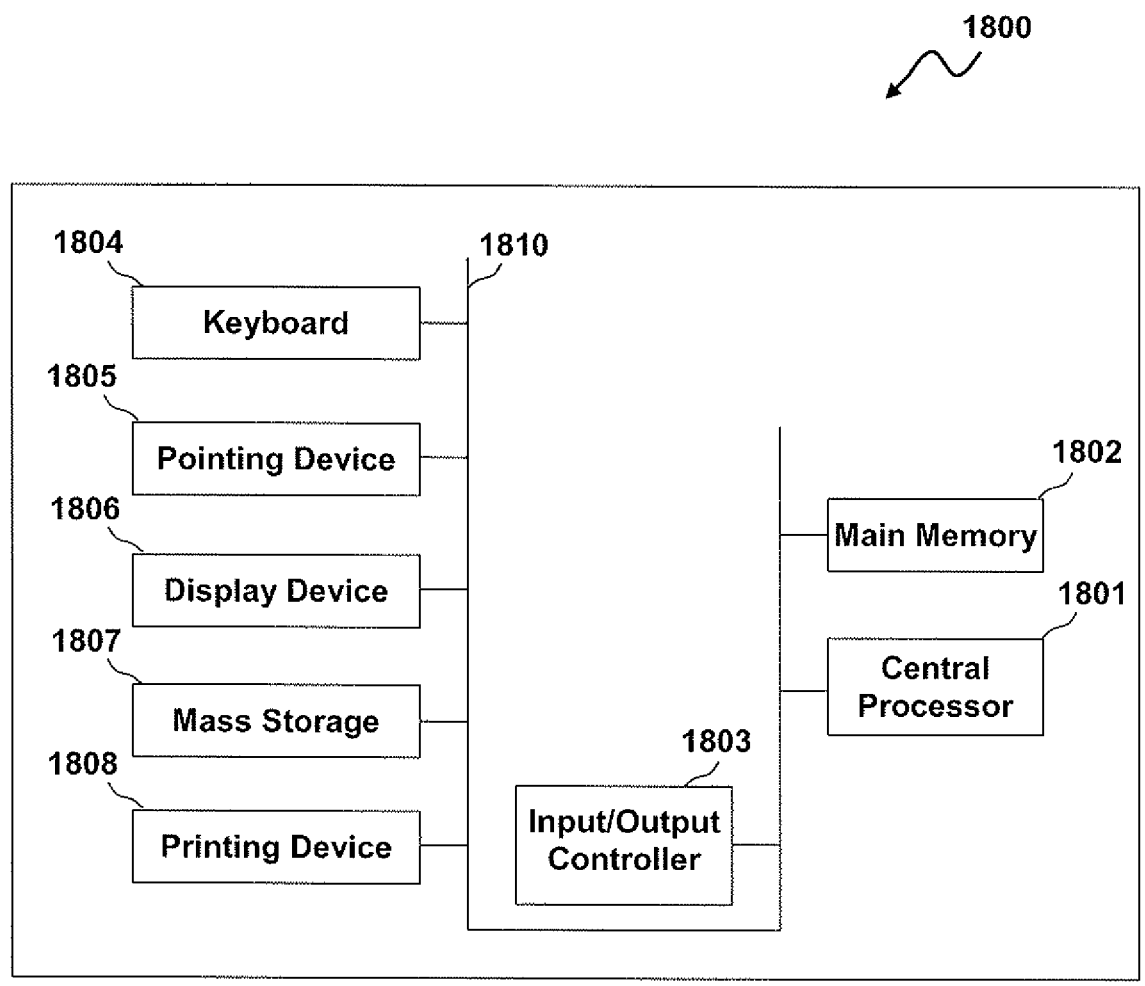
FIG. 18 illustrates a schematic view of a computer system in which embodiments of the present invention may be implemented.
Figure 19:
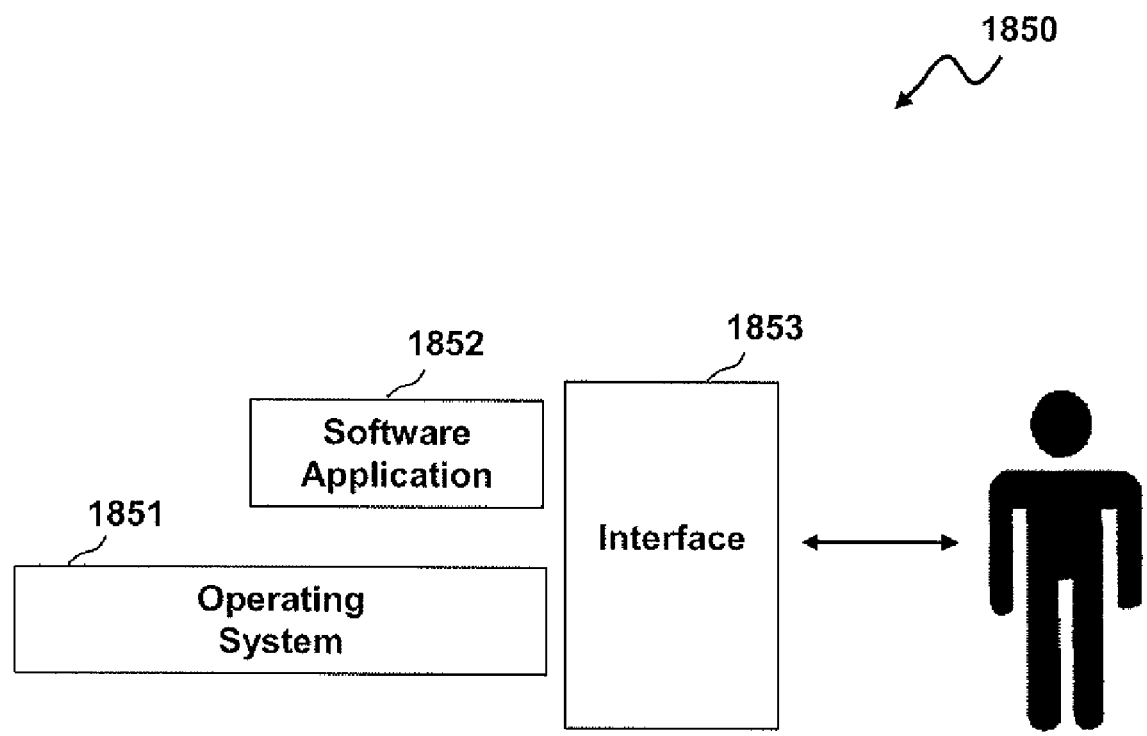
FIG. 19 illustrates a schematic view of a software system including an operating system, application software, and a user interface for carrying out the present invention.
Figure 20:
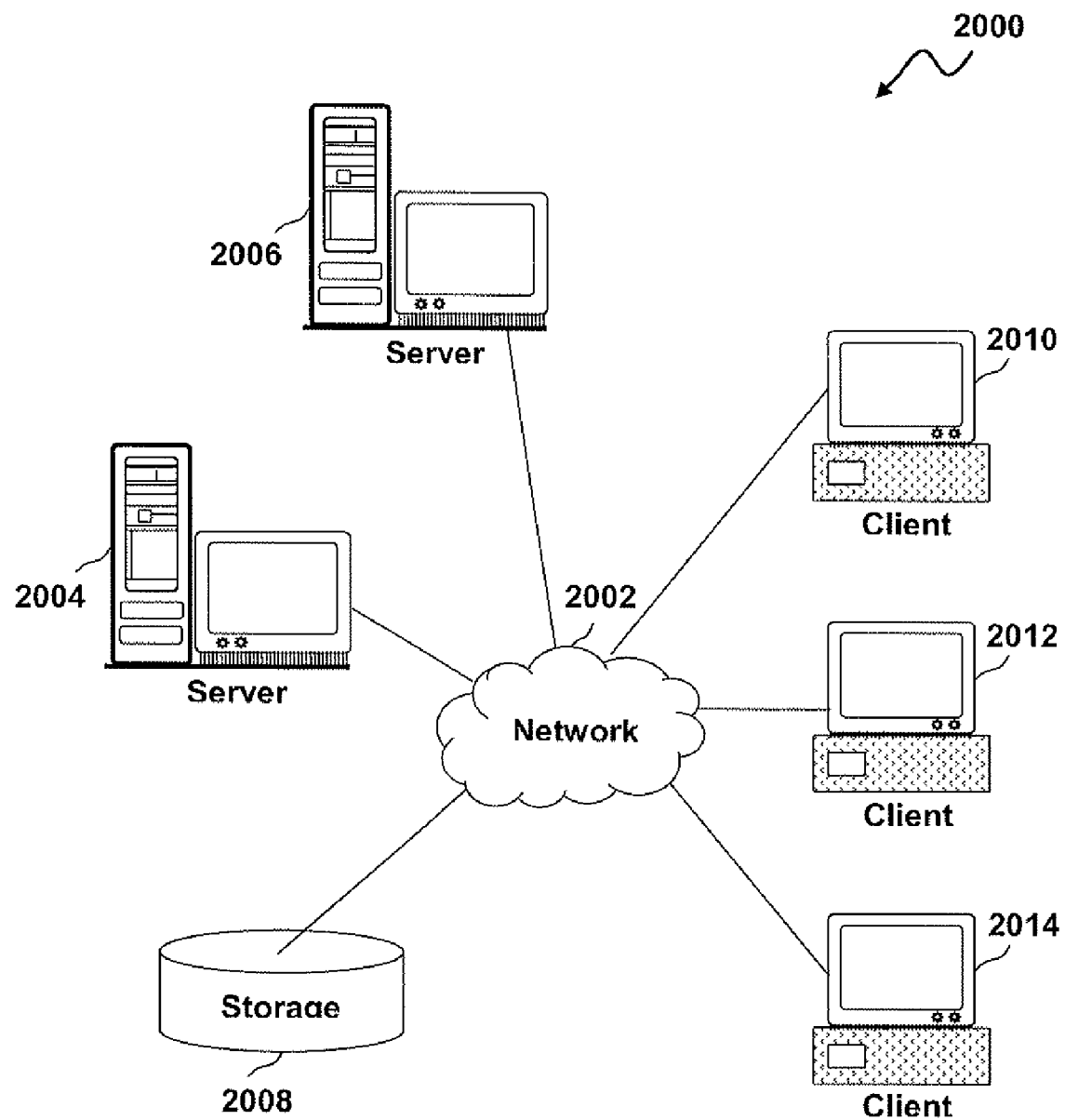
FIG. 20 illustrates a graphical representation of a network of data processing systems in which aspects of the present invention may be implemented.

FIGS. 18, 19, and 20 are provided as exemplary diagrams of data processing environments in which embodiments of the present invention may be implemented. It should be appreciated that the configurations depicted in FIGS. 18, 19 and 20 are only exemplary and are not intended to assert or imply any limitation with regard to the environments in which aspects or embodiments of the present invention may be implemented. Many modifications to the depicted environments may be made without departing from the spirit and scope of the present invention.

As depicted in FIG. 18, the present invention may be embodied in the context of a data-processing apparatus 1800 comprising a central processor 1801, a main memory 1802, an input/output controller 1803, a keyboard 1804, a pointing device 1805 (e.g., mouse, track ball, pen device, or the like), a display device 1806, and a mass storage 1807 (e.g., hard disk). Additional input/output devices, such as a printing device 1808, may be included in the data-processing apparatus 1800 as desired. The respective models/methods and/or algorithms described herein with respect to FIGS. 5-17 can be incorporated into the main memory 1802. As illustrated, the various components of the data-processing apparatus 1800 can communicate through a system bus 1810 or similar architecture. Data-processing apparatus may constitute a server or a group of interconnected servers, depending upon design considerations. For example, data-processing apparatus may constitute servers, such as, for example, servers 1104 and 1106 as depicted in FIG. 20.

In FIG. 19 a computer software system 1850 is illustrated, which can be provided for directing the operation of the data-processing apparatus 1800 of FIG. 18. Software system 1850, which is stored in a system memory 1802 and/or on a disk memory 1807, generally includes a kernel or operating system 1851 and a shell or interface 1853. One or more application programs, such as application software 1852, may be "loaded" (i.e., transferred from storage 1807 into memory 1802), for execution by the data-processing apparatus 1800. The application software 1852 especially contains programs associated with the models/methods and/or algorithms described in FIGS. 5-17. The data-processing apparatus 1800 receives user commands and data through user interface 1853; these inputs may then be acted upon by the data-processing apparatus 1800 in accordance with instructions from operating module 1851 and/or application module 1852.

The interface 1853 can be implemented as a graphical user interface (GUI). In some embodiments, operating system 1851 and interface 1853 can be implemented in the context of a "Windows" system or another appropriate computer operating system. Application module 1852, on the other hand, can include instructions, such as the various operations described herein with respect to the various components and modules described herein, such as, for example, the method/models depicted and described herein.

FIG. 20 illustrates a schematic view of a system 2000 in which aspects of the present invention may be implemented. Note that the system 2000 can be implemented in the context of a software module such as application software 1852. The system 2000 includes a network 2002 in communication with one or more clients 2010, 2012, and 2014. Network 2002 can further communicate with one or more servers 2004 and 2006 and a memory storage unit, such as, for example, memory or database 2008. The database 2008 can store the application algorithms in relation to the optimal multivariable MPC controllers 510. Each of the clients 2010, 2012 and 2014 may be implemented as, for example, a data-processing apparatus such as apparatus 1800 as depicted in FIG. 18. Each server 2004, 2006 may also constitute a data-processing apparatus, such as apparatus 1800 as depicted in FIG. 18.

The aforementioned description is presented with respect to embodiments of the present invention, and can be embodied in the context of a data-processing system such as data-processing apparatus 1800 and a computer software system 1850. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments which follows is for purposes of illustration and not considered a limitation.

The respective models/methods and/or algorithms described herein with respect to FIGS. 5-17 can be implemented in the context of a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as, but not limited to, Random Access Memory (RAM), and communication media, such as computer and telephone networks including Ethernet, the Internet, wireless networks, and like network systems. For example, system 2000 may represent a network such as the "Internet", depending upon design considerations.

It should be understood, therefore, that such signal-bearing media when carrying or encoding computer readable instructions that direct the various methods/modules/algorithms with respect to the present invention, may represent alternative embodiments. Further, it is understood that the present invention may be implemented by a system having means in the form of hardware, software, or a combination of software and hardware as described herein or their equivalent. Thus, the methods/algorithms and components/modules described herein with respect to FIGS. 5-17 can be deployed as process software in the context of a computer system or data-processing system as that depicted in FIGS. 18, 19, and/or 20 herein, or other data-processing devices, networks and systems.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A computer-implemented method for controlling a constrained dynamic system, said computer-implemented method comprising:
   providing a state observer for determining a plurality of values associated with a constrained dynamic system in order to generate a plurality of state variables thereof; and
   implementing an explicit quadratic programming solver having an off-line part and an on-line part, said explicit quadratic programming solver solving at least one explicit quadratic programming problem utilizing at least one of a primal-dual feasibility algorithm and a graph algorithm, wherein said explicit quadratic programming solver computes a plurality of control signals based on said plurality of state variables and a plurality of matrices stored in said off-line part of said explicit quadratic programming solver to control said constrained dynamic system.

2. The computer-implemented method of claim 1 wherein said on-line part utilizes said primal-dual feasibility algorithm and/or said graph algorithm.

3. The computer-implemented method of claim 1 wherein said off-line part solves a model predictive control problem and delivers with respect to said primal-dual feasibility algorithm, a data structure comprising vectors and matrices defining constraints related to the explicit quadratic programming problem.

4. The computer-implemented method of claim 1 wherein said off-line part solves a model predictive control problem and delivers with respect to said graph algorithm, a plurality of matrices, a plurality of vectors and a structure containing a directed graph.

5. The computer-implemented method of claim 1 wherein said plurality of values associated with said constrained dynamic system comprise a plurality of present and/or past values associated with at least one actuator and at least one sensor utilized in said constrained dynamic system.

6. The computer-implemented method of claim 5 further comprising associating said state observer with said at least one sensor and said at least one actuator.

7. The computer-implemented method of claim 1 wherein said primal-dual feasibility algorithm further comprises:
   computing and storing said plurality of matrices in said off-line part of said explicit quadratic programming solver in order to calculate a plurality of vectors of Lagrange multipliers and an optimizer in said on-line part of said explicit quadratic programming solver; and
   checking a primal-dual feasibility of said plurality of vectors in said on-line part of said explicit quadratic programming solver utilizing said Lagrange multipliers and said optimizer to determine a unique optimal solution for said constrained dynamic system.

8. The computer-implemented method of claim 1 wherein said graph algorithm further comprises:
   computing and storing said plurality of matrices and said plurality of vectors, and constructing and storing a directed graph in said off-line part of said explicit quadratic programming solver, wherein said directed graph is associated with a plurality of control laws and a plurality of constraints;
   determining a set of feasible control laws utilizing said directed graph; and
   determining an optimal control law within said set of feasible control laws in said on-line part of said explicit quadratic programming solver.

9. The computer-implemented method of claim 8 wherein said plurality of matrices is defined for one or more feasible combinations of said plurality of constraints.

10. The computer-implemented method of claim 1 wherein said primal-dual feasibility algorithm and said graph algorithm are applicable in a model predictive control application and an embedded application having a low computing power, a low memory, and a fast sample time.

11. The computer-implemented method of claim 1 implemented by a multivariable controller that comprises a specialized real-time control platform.

12. The computer-implemented method of claim 11 wherein said specialized real-time control platform includes an electronic controller unit.

13. A computer-implemented method for controlling a constrained dynamic system, said computer-implemented method comprising:
   providing a state observer for determining a plurality of values associated with a constrained dynamic system in order to generate a plurality of state variables thereof; and
   implementing an explicit quadratic programming solver having an off-line part and an on-line part, said explicit quadratic programming solver solving at least one explicit quadratic programming problem utilizing at least one of a primal-dual feasibility algorithm and a graph algorithm, wherein said explicit quadratic programming solver computes a plurality of control signals based on said plurality of state variables and a plurality of matrices stored in said off-line part of said explicit quadratic programming solver to control said constrained dynamic system, and wherein said on-line part utilizes said primal-dual feasibility algorithm and/or said graph algorithm.

14. The computer-implemented method of claim 13 wherein:
   said off-line part solves a model predictive control problem and delivers with respect to said primal-dual feasibility algorithm, a data structure comprising vectors and matrices defining constraints related to the explicit quadratic programming problem; or
   wherein said off-line part solves a model predictive control problem and delivers with respect to said graph algorithm, a plurality of matrices, a plurality of vectors and a structure containing a directed graph.

15. A system for controlling a constrained dynamic system, comprising:
   a processor;
   a data bus coupled to said processor; and
   a computer-usable medium embodying computer code, said computer-usable medium being coupled to said data bus, said computer program code comprising instructions executable by said processor and configured for:
   providing a state observer for determining a plurality of values associated with a constrained dynamic system in order to generate a plurality of state variables thereof; and
   implementing an explicit quadratic programming solver having an off-line part and an on-line part, said explicit quadratic programming solver solving at least one explicit quadratic programming problem utilizing at least one of a primal-dual feasibility algorithm and a graph algorithm, wherein said explicit quadratic programming solver computes a plurality of control signals based on said plurality of state variables and a plurality of matrices stored in said off-line part of said explicit quadratic programming solver to control said constrained dynamic system.

16. The system of claim 15 wherein said on-line part utilizes said primal-dual feasibility algorithm and/or said graph algorithm.

17. The system of claim 15 wherein said off-line part solves a model predictive control problem and delivers with respect to said primal-dual feasibility algorithm, a data structure comprising vectors and matrices defining constraints related to the explicit quadratic programming problem.

18. The system of claim 15 wherein said off-line part solves a model predictive control problem and delivers with respect to said graph algorithm, a plurality of matrices, a plurality of vectors and a structure containing a directed graph.

19. The system of claim 15 wherein said plurality of values associated with said constrained dynamic system comprise a plurality of present and/or past values associated with at least one actuator and at least one sensor utilized in said constrained dynamic system.

20. The system of claim 15 wherein said primal-dual feasibility algorithm further comprises:
computing and storing said plurality of matrices in said off-line part of said explicit quadratic programming solver in order to calculate a plurality of vectors of Lagrange multipliers and an optimizer in said on-line part of said explicit quadratic programming solver; and
checking a primal-dual feasibility of said plurality of vectors in said on-line part of said explicit quadratic programming solver utilizing said Lagrange multipliers and said optimizer to determine a unique optimal solution for said constrained dynamic system.

* * * * *